(12) United States Patent
Takahashi et al.

(10) Patent No.: US 11,122,331 B2
(45) Date of Patent: Sep. 14, 2021

(54) RECEIVING DEVICE, TRANSMITTING DEVICE, AND DATA PROCESSING METHOD

(71) Applicant: SONY SEMICONDUCTOR SOLUTIONS CORPORATION, Atsugi (JP)

(72) Inventors: Kazuyuki Takahashi, Chiba (JP); Lachlan Bruce Michael, Saitama (JP)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 0 days.

(21) Appl. No.: 16/300,294

(22) PCT Filed: Jun. 16, 2017

(86) PCT No.: PCT/JP2017/022247
§ 371 (c)(1),
(2) Date: Nov. 9, 2018

(87) PCT Pub. No.: WO2018/003540
PCT Pub. Date: Jan. 4, 2018

(65) Prior Publication Data
US 2019/0124397 A1    Apr. 25, 2019

(30) Foreign Application Priority Data

Jun. 30, 2016 (JP) .............................. JP2016-130849

(51) Int. Cl.
*H04N 21/462* (2011.01)
*H04H 20/22* (2008.01)
(Continued)

(52) U.S. Cl.
CPC ........... *H04N 21/4621* (2013.01); *H04B 1/16* (2013.01); *H04H 20/22* (2013.01); *H04H 20/28* (2013.01);
(Continued)

(58) Field of Classification Search
CPC ......... H04N 21/234327; H04N 21/234; H04N 21/2343; H04N 21/234381
See application file for complete search history.

(56) References Cited

U.S. PATENT DOCUMENTS 5,953,506 A * 9/1999 Kalra .................... G06T 3/4092
345/428
2006/0083315 A1 4/2006 Sato et al.
(Continued)

FOREIGN PATENT DOCUMENTS

JP    2007-288683 A    11/2007
JP    2008-206015 A    9/2008
(Continued)

OTHER PUBLICATIONS

International Search Report dated Sep. 5, 2017 in PCT/JP2017/022247, citing documents AO-AS therein, 2 pages.
(Continued)

*Primary Examiner* — Jefferey F Harold
*Assistant Examiner* — Timothy R Newlin
(74) *Attorney, Agent, or Firm* — Oblon, McClelland, Maier & Neustadt, L.L.P.

(57) ABSTRACT

The present technology relates to a receiving device, a transmitting device, and a data processing method, in which seamless reproduction can be performed at the time of switching a broadcast signal.
A receiving device receives a plurality of broadcast signals, and selects a broadcast signal of a target from the plurality of broadcast signals, on the basis of a result of processing with respect to the broadcast signal, and thus, it is possible to perform seamless reproduction at the time of switching the broadcast signal. The present technology, for example, can be applied to a receiver which is capable of receiving digital television broadcast.

11 Claims, 23 Drawing Sheets

(51) Int. Cl.

| | | |
|---|---|---|
| *H04N 21/2365* | (2011.01) | |
| *H04N 21/2662* | (2011.01) | |
| *H04H 20/28* | (2008.01) | |
| *H04H 60/12* | (2008.01) | |
| *H04N 21/43* | (2011.01) | |
| *H04H 60/37* | (2008.01) | |
| *H04B 1/16* | (2006.01) | |
| *H04N 21/2343* | (2011.01) | |
| *H04N 21/633* | (2011.01) | |
| *H04N 21/442* | (2011.01) | |
| *H04N 21/4385* | (2011.01) | |
| *H04N 21/44* | (2011.01) | |
| *H04H 20/30* | (2008.01) | |

(52) U.S. Cl.
CPC ............ *H04H 60/12* (2013.01); *H04H 60/37* (2013.01); *H04N 21/2365* (2013.01); *H04N 21/23439* (2013.01); *H04N 21/2662* (2013.01); *H04N 21/43* (2013.01); *H04N 21/4302* (2013.01); *H04N 21/4385* (2013.01); *H04N 21/44008* (2013.01); *H04N 21/44245* (2013.01); *H04N 21/462* (2013.01); *H04N 21/633* (2013.01); *H04H 20/30* (2013.01)

(56) References Cited

U.S. PATENT DOCUMENTS

| | | | |
|---|---|---|---|
| 2007/0126936 A1 | 6/2007 | Fujihira et al. | |
| 2011/0002399 A1* | 1/2011 | Raveendran | H04H 20/42 375/240.28 |
| 2011/0255535 A1* | 10/2011 | Tinsman | H04L 47/10 370/390 |
| 2012/0016965 A1 | 1/2012 | Chen et al. | |
| 2013/0064283 A1* | 3/2013 | Sun | H04N 21/2343 375/240.01 |
| 2013/0291031 A1* | 10/2013 | Dow | H04N 21/234327 725/93 |
| 2014/0185466 A1* | 7/2014 | Syed | H04L 43/50 370/252 |
| 2014/0282771 A1* | 9/2014 | Tumuluru | H04N 21/2662 725/95 |
| 2015/0049757 A1 | 2/2015 | Hammer et al. | |
| 2016/0080783 A1* | 3/2016 | Yamagishi | H04N 21/2343 725/109 |
| 2016/0112731 A1 | 4/2016 | Tsukagoshi | |
| 2017/0142425 A1 | 5/2017 | Iguchi et al. | |
| 2017/0201761 A1* | 7/2017 | Walker | H04N 19/46 |
| 2017/0238160 A1 | 8/2017 | Takahashi et al. | |

FOREIGN PATENT DOCUMENTS

| | | |
|---|---|---|
| JP | 2008-300910 A | 12/2008 |
| JP | 2015-192401 A | 11/2015 |
| JP | 2016-39629 A | 3/2016 |
| JP | 2016-100845 A | 5/2016 |
| JP | 2016-146574 A | 8/2016 |
| WO | 2013/005406 A1 | 1/2013 |
| WO | 2013/021600 A1 | 2/2013 |
| WO | WO 2013/144158 A1 | 10/2013 |
| WO | WO 2014/196336 A1 | 12/2014 |
| WO | WO 2016/063731 A1 | 4/2016 |

OTHER PUBLICATIONS

Extended European Search Report dated Feb. 27, 2019 in Patent Application No. 17819900.6, citing documents AA-AD and AO therein, 7 pages.

* cited by examiner

FIG. 9

L1-Basic Signaling Fields and Syntax

| Syntax | No. of Bits | Format |
|---|---|---|
| L1_Basic_signaling() { | | |
| L1B_version | 3 | uimsbf |
| L1B_mimo_scattered_pilot_encoding | 1 | uimsbf |
| L1B_lls_flag | 1 | uimsbf |
| L1B_time_info_flag | 2 | uimsbf |
| L1B_RAP_EXIST_FLAG | 1 | uimsbf |
| L1B_reserved | 47 | uimsbf |
| L1B_crc | 32 | uimsbf |
| } | | |

FIG. 10

L1-Detail Signaling Fields and Syntax

| Syntax | No. of Bits | Format |
|---|---|---|
| L1_Detail_signaling() { | | |
|   L1D_version | 4 | uimsbf |
|   L1D_num_rf | 3 | uimsbf |
|   for(L1D_rf_id=1..L1D_num_rf) { | | |
|     L1D_rf_frequency | 19 | uimsbf |
|   } | | |
|   if(RAP_EXIST_FLAG) { | | |
|     RAP | 1 | uimsbf |
|     AdaptationSet | 8 | uimsbf |
|   } | | |
|   L1D_reserved | as needed | uimsbf |
|   L1D_crc | 32 | uimsbf |
| } | | |

FIG. 17

| Syntax | No. of Bits | Mnemonic | Semantics |
|---|---|---|---|
| RAP | 1 | uimsbf | FLAG INDICATING THAT RAP IS INCLUDED IN CORRESPONDING BB PACKET |
| AdaptationSet | 8 | uimsbf | Adaptation Set INCLUDING RAP |
| SequenceNumber | 15 | uimsbf | SEQUENCE NUMBER OF BB PACKET (1 IS ADDED FOR EACH BB PACKET, REGARDLESS OF PRESENCE OR ABSENCE OF RAP) |

RECEIVING DEVICE, TRANSMITTING DEVICE, AND DATA PROCESSING METHOD

TECHNICAL FIELD

The present technology relates to a receiving device, a transmitting device, and a data processing method, and in particular, relates to a receiving device, a transmitting device, and a data processing method, in which it is possible to perform seamless reproduction at the time of switching a broadcast signal.

BACKGROUND ART

For example, a receiver capable of receiving a plurality of broadcast signals of a program which is simultaneously broadcast, such as a one-segment broadcast program and a full-segment broadcast program, is known (for example, refer to Patent Document 1).

CITATION LIST

Patent Document

Patent Document 1: Japanese Patent Application Laid-Open No. 2008-300910

SUMMARY OF THE INVENTION

Problems to be Solved by the Invention

However, in the receiver, there is a case where a disturbance occurs in a video or a sound in a case of switching a broadcast program which is simultaneously broadcast, or the like. For this reason, it has been required to perform seamless reproduction at the time of switching the broadcast signal to be received.

The present technology has been made in consideration of such circumstances, and thus, in the present technology, it is possible to perform seamless reproduction at the time of switching a broadcast signal.

Solution to Problems

A receiving device according to a first aspect of the present technology includes: a receiving unit configured to receive a plurality of broadcast signals; and a control unit configured to select a broadcast signal of a target from the plurality of broadcast signals, on the basis of a result of processing with respect to the broadcast signal.

A receiving device according to the first aspect of the present technology may be an independent device, or may be an internal block configuring one device. In addition, a data processing method according to the first aspect of the present technology is a data processing method corresponding to the receiving device according to the first aspect of the present technology described above.

In the receiving device and the data processing method according to the first aspect of the present technology, a plurality of broadcast signals is received, and a broadcast signal of a target is selected from the plurality of broadcast signals, on the basis of a result of processing with respect to the broadcast signal.

A transmitting device according to a second aspect of the present technology includes: a generating unit configured to generate video boundary information which is information indicating a boundary of a video of the same or corresponding contents; and a transmitting unit configured to transmit the video boundary information by including the video boundary information in each of a plurality of broadcast signals for transmitting the contents.

A transmitting device according to the second aspect of the present technology may be an independent device, or may be an internal block configuring one device. In addition, a data processing method according to the second aspect of the present technology is a data processing method corresponding to the transmitting device according to the second aspect of the present technology described above.

In the transmitting device and the data processing method according to the second aspect of the present technology, video boundary information which is information indicating a boundary of a video of the same or corresponding contents, is generated, and the video boundary information is transmitted by being included in the plurality of broadcast signals, the plurality of broadcast signals being for transmitting the contents.

Effects of the Invention

According to the first aspect and the second aspect of the present technology, it is possible to perform seamless reproduction at the time of switching a broadcast signal.

Furthermore, the effects described herein are not necessarily limited, and may be any of the effects described herein.

BRIEF DESCRIPTION OF DRAWINGS

FIG. 9 is a diagram illustrating an example of the syntax of L1 basic information.

FIG. 10 is a diagram illustrating an example of the syntax of L1 detail information.

FIG. 17 is a diagram illustrating an example of the syntax of video boundary information.

MODE FOR CARRYING OUT THE INVENTION

Hereinafter, an embodiment of the present technology will be described with reference to the drawings. Furthermore, the description will be given in the following order.

1. Configuration of System
2. Outline of Present Technology
3. Seamless Reproduction Control of Present Technology
(1) Control in Physical Frame Unit
(2-1) Control in BB Packet Unit (TDM)
(2-2) Control in Hierarchy Unit (FDM)
(3) Selection Control of Decoding Target according to Quality or the Like of Received Signal
4. Flow of Seamless Reproduction Processing
5. Modification Example
6. Configuration of Computer <1. Configuration of System>

(Configuration Example of Transmission System)

Figure 1:
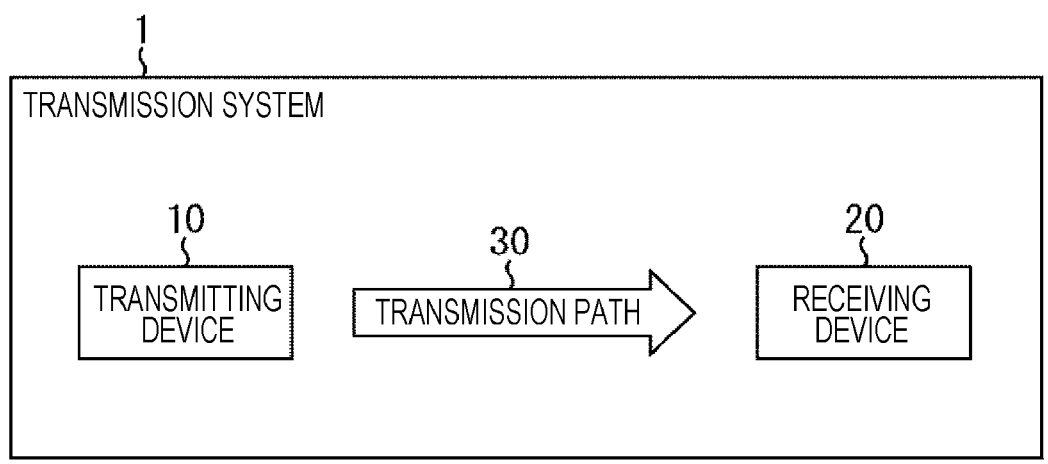
FIG. 1 is a diagram illustrating a configuration of one embodiment of a transmission system to which the present technology is applied.

FIG. 1 is a diagram illustrating a configuration of one embodiment of a transmission system to which the present technology is applied. Furthermore, the system indicates a system in which a plurality of devices is logically collected.

In FIG. 1, a transmission system 1 includes a transmitting device 10 and a receiving device 20. In the transmission system 1, data transmission is performed on the basis of a predetermined broadcast system.

The transmitting device 10 is a transmitter corresponding to the predetermined broadcast system, and transmits contents through a transmission path 30. For example, the transmitting device 10 transmits a broadcast stream including a video, a sound, or the like (the components thereof) configuring the contents of a broadcast program or the like, and signaling, through the transmission path 30, as a broadcast wave.

The receiving device 20 is a receiver corresponding to a predetermined broadcast system, and receives and outputs the contents which are transmitted from the transmitting device 10 through the transmission path 30. For example, the receiving device 20 receives the broadcast wave from the transmitting device 10, processes the video, the sound, or the like (the components thereof) configuring the contents and the signaling, which are included in the broadcast stream, and reproduces the video or the sound of the contents of the broadcast program or the like.

Furthermore, in the transmission system 1, the transmission path 30, for example, may be a satellite broadcast using a broadcasting satellite (BS) or a communications satellite (CS), or may be a cable broadcast (CATV) using a cable, or the like, in addition to a ground wave (a terrestrial broadcast).

(Configuration Example of Transmitting Device)

Figure 2:
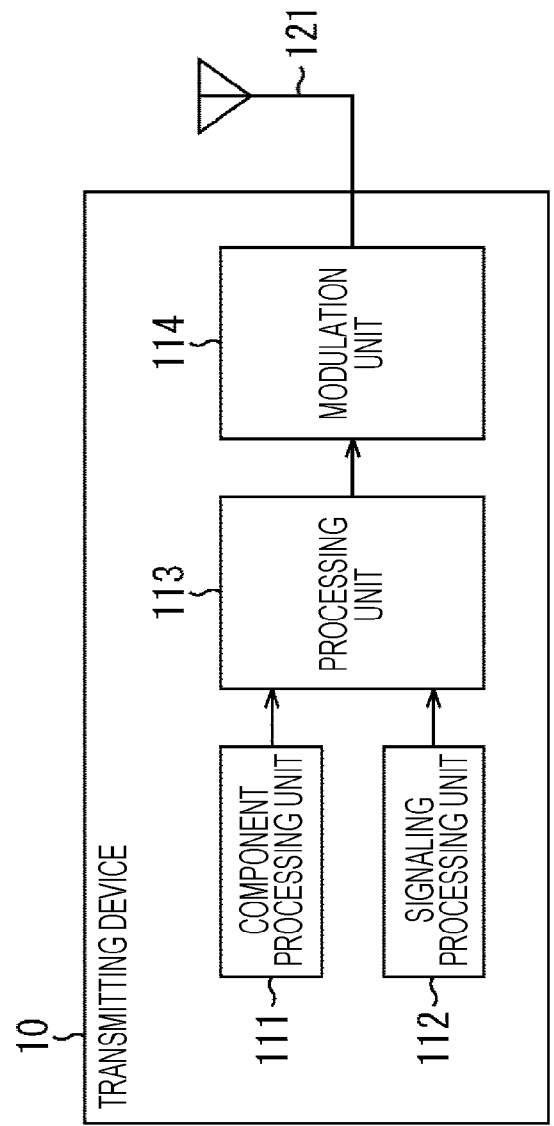
FIG. 2 is a diagram illustrating a configuration example of a transmitting device.

FIG. 2 is a diagram illustrating a configuration example of the transmitting device 10 of FIG. 1.

In FIG. 2, the transmitting device 10 includes a component processing unit 111, a signaling processing unit 112, a processing unit 113, and a modulation unit 114.

The component processing unit 111 acquires the contents to be input thereinto. Here, the contents are configured of components of a video or a sound, a caption, or the like. In addition, a plurality of the same or the corresponding contents, for example, with different screen resolutions or different sounds, can be prepared as the contents.

The component processing unit 111 processes the data of the video or the sound of the contents (for example, coding processing), and supplies a video signal or a sound signal to be obtained as a result thereof, to the processing unit 113.

The signaling processing unit 112 acquires data for generating control information used in demodulation processing, reproduction processing, or the like, on the receiving device 20 side, which is input thereinto. The signaling processing unit 112 generates the signaling (the control information) on the basis of the data for the control information, and supplies the signaling (the control information) to the processing unit 113.

The processing unit 113 performs necessary processing with respect to the video signal or the sound signal supplied from the component processing unit 111, and the signaling supplied from the signaling processing unit 112, and supplies a multiplexing stream to be obtained as a result thereof, to the modulation unit 114.

The modulation unit 114 performs modulation processing with respect to the multiplexing stream supplied from the processing unit 113, and transmits a signal to be obtained as a result thereof through an antenna 121, as the broadcast signal.

The transmitting device 10 is configured as described above. Furthermore, in FIG. 2, for convenience of description, it is described that the transmitting device 10 is configured of a single device, but the transmitting device 10 on a transmission side, can be a system including a plurality of devices having each function of a block of FIG. 2.

(Configuration Example of Receiving Device)

Figure 3:
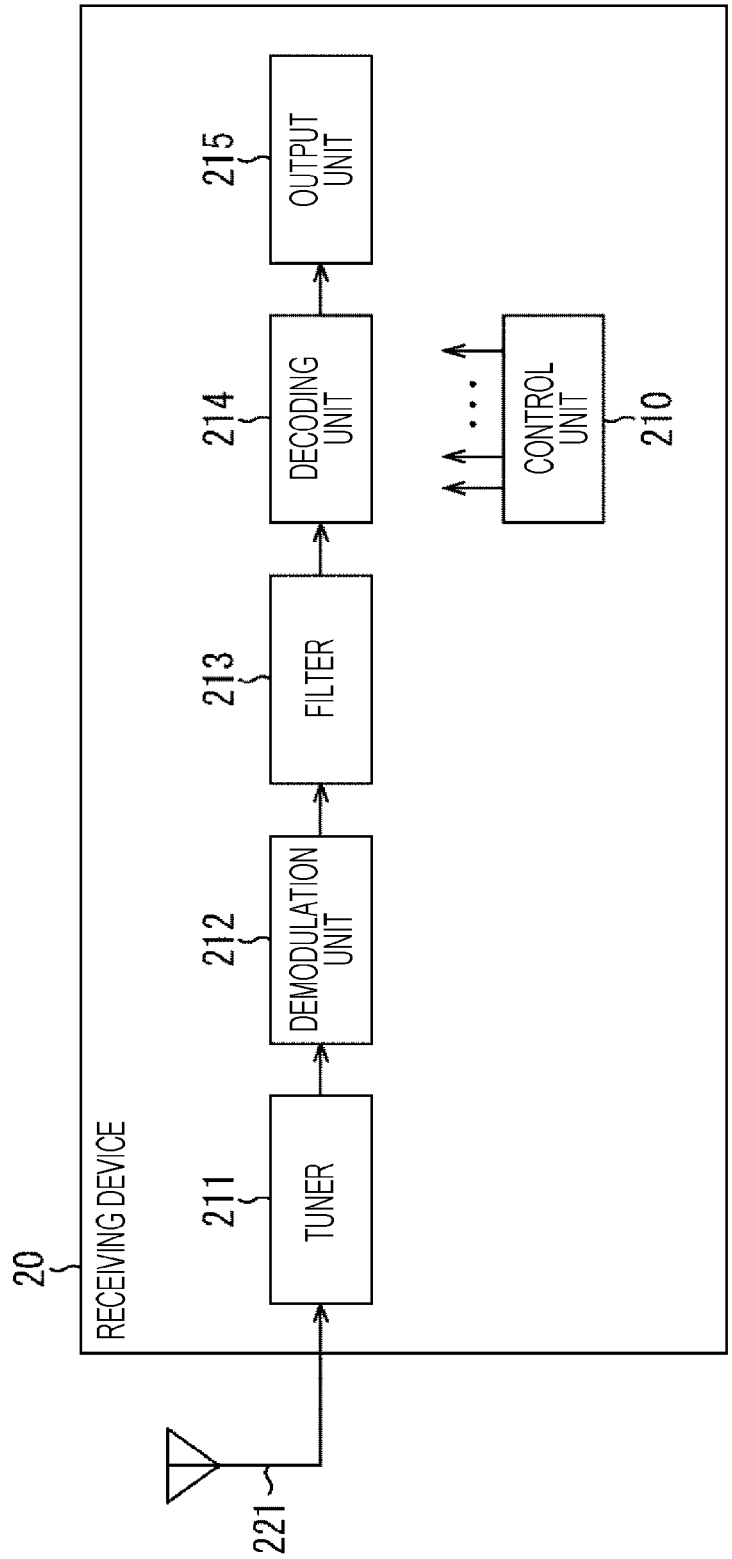
FIG. 3 is a diagram illustrating a configuration example of a receiving device.

FIG. 3 is a diagram illustrating a configuration example of the receiving device 20 of FIG. 1.

In FIG. 3, the receiving device 20 includes a control unit 210, a tuner 211, a demodulation unit 212, a filter 213, a decoding unit 214, and an output unit 215.

The control unit 210, for example, includes a central processing unit (CPU), a microprocessor, or the like. The control unit 210 controls the operation of each unit of the receiving device 20.

The tuner 211 processes a broadcast signal of a predetermined frequency band, which is received through the antenna 221, according to the control from the control unit 210, and supplies a received signal to be obtained as a result thereof, to the demodulation unit 212.

The demodulation unit 212, for example, includes a demodulation large scale integration (LSI) or the like. The demodulation unit 212 performs the demodulation processing with respect to the received signal supplied from the tuner 211, according to the control from the control unit 210, and supplies a multiplexing stream to be obtained as a result thereof, to the filter 213.

The filter 213 processes the multiplexing stream supplied from the demodulation unit 212, according to the control from the control unit 210, and supplies a video signal or a sound signal to be obtained as a result thereof, to the decoding unit 214.

The decoding unit 214 decodes the video signal or the sound signal supplied from the filter 213, according to the control from the control unit 210, and supplies data of a video or a sound to be obtained as a result thereof, to the output unit 215. Furthermore, the filter 213 or the decoding unit 214, for example, includes a main system on chip (SoC) or the like.

The output unit 215, for example, includes an output interface circuit or the like. The output unit 215 processes the data of the video or the sound supplied from the decoding unit 214, and outputs the data to a display device (not illustrated), a speaker (not illustrated), or the like. With this arrangement, in the receiving device 20, the contents of the broadcast program or the like are reproduced, and thus, the video or the sound thereof is output.

Furthermore, in FIG. 3, the receiving device 20 may include a display such as a liquid crystal display (LCD) or an organic electroluminescence display (OELD), or a speaker, and thus, may output the video or the sound according to the data from the output unit 215.

The receiving device 20 is configured described above.

<2. Outline of Present Technology>

For example, in an integrated services digital broadcasting-terrestrial (ISDB-T) which is a broadcast system adopted in Japan and other countries, a broadcast mainly for a fixed receiver, hi-vision broadcast using twelve segments (hereinafter, referred to as a full-segment broadcast), a broadcast mainly for a mobile receiver, "one segment partial reception service for a mobile phone and a mobile terminal" using one segment (hereinafter, referred to as a one-segment broadcast) are defined as a terrestrial digital television broadcast. In addition, in the terrestrial digital television broadcast, a simultaneous broadcast of broadcasting the same broadcast program (contents) is performed by the full-segment broadcast and the one-segment broadcast.

Recently, a mobile receiver capable of receiving not only one-segment broadcast, but also, a so-called full-segment broadcast, have spread, as the mobile receiver provided with a tuner of a terrestrial digital television broadcast, such as a mobile phone or a smart phone.

In such a type of mobile receiver, it is possible to switch a broadcast signal to be received, according to a reception environment, such that in a case where a reception environment is good, the full-segment broadcast is received, and in a case where the reception environment is bad, the one-segment broadcast is received. For example, the full-segment broadcast is considered as an HD resolution video (a video corresponding to screen resolution of approximately 1920 pixels×1080 pixels), and the one-segment broadcast is considered as a QVGA resolution video (a video corresponding to screen resolution of approximately 320 pixels× 240 pixels).

However, in the mobile receiver, at the time of switching the broadcast signal to be received according to the reception environment, for example, there is a case where disturbance such as freeze-up or a block error, occurs in a video or a sound. For example, one factor of such a phenomenon is that a switching timing of a signal to be processed on a physical layer in a protocol stack of a broadcast system, is not coincident with a boundary of a group of pictures (GOP) structure to be obtained from the signal processed on the higher layer.

Furthermore, the GOP is configured of an I picture, a B picture, or a P picture, and includes at least one I picture. In addition, the I picture is an image which is coded by only using the current image information. The B picture is an image which is coded by using the current image information, the past image information, and the future image information. The P picture is an image which is coded by using the current image information and the past image information.

On the other hand, in an advanced television systems committee (ATSC) which is a broadcast system adopted in the U.S.A. or the like, ATSC 3.0 which is one of next-generation terrestrial broadcast standards, has been formulated. In the ATSC 3.0, a plurality of signals having different bit rates or robustness is prepared as a broadcast signal, and thus, an operation is assumed that the broadcast signal to be received is switched according to the reception environment, in the receiver.

In a case of performing such an operation, for example, a 4K resolution video (a video corresponding to screen resolution of approximately 4000 pixels×2000 pixels) and a sound can be transmitted at a high bit rate and low robustness, an HD resolution video (a video corresponding to screen resolution of approximately 1920 pixels×1080 pixels) and a sound can be transmitted at an intermediate bit rate and intermediate robustness, and only a sound can be transmitted at a low bit rate and high robustness.

In such a case, in a case where the reception environment of the receiver is good, the broadcast signal of the 4K resolution video and the sound can be selected and received, but in a case where the reception environment of the receiver is bad, the HD resolution video and the sound are selected, or in the worst case, only the sound is selected and received. At this time, for example, there is a case where disturbance such as freeze-up, occurs in the video or the sound, due to a switch between the 4K resolution video and the HD resolution video, and one factor thereof is that the switching timing of the signal to be processed on the physical layer, is not coincident with the boundary of the GOP structure to be obtained from the signal processed on the higher layer.

Thus, in a case where the switching timing of the signal on the physical layer is not coincident with the boundary of the video to be obtained from the signal of the higher layer at the time of switching the broadcast signal, the disturbance occurs in the video or the sound, and thus, in the present technology, it is proposed that the occurrence of the disturbance in the video or the sound at the time of switching the broadcast signal, is suppressed, and the seamless reproduction is performed, in consideration of such circumstances.

(Principle of Seamless Reproduction)

Here, the principle of the seamless reproduction to which the present technology is applied, will be described with reference to FIG. 4 and FIG. 5.

Figure 4:
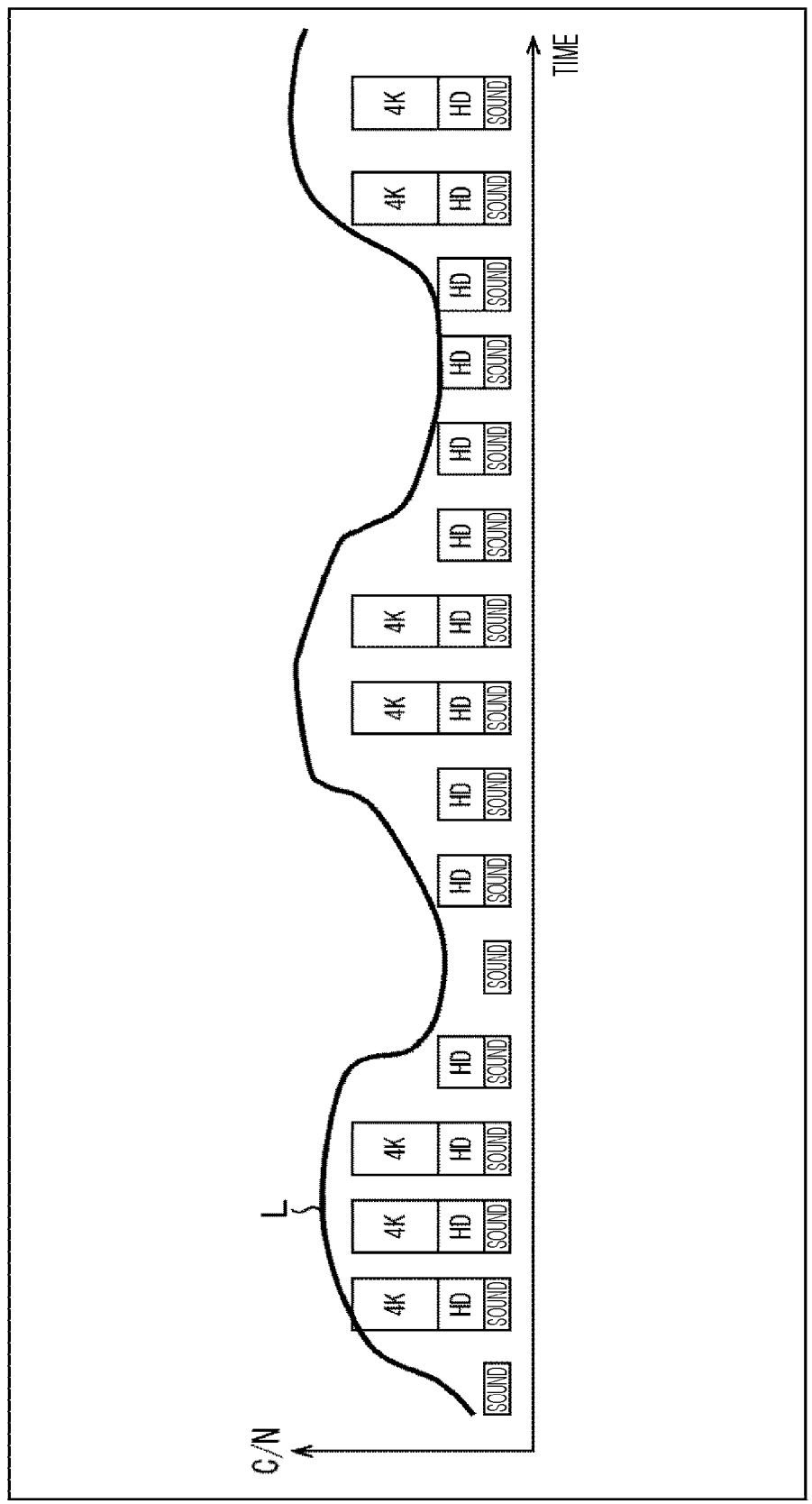
FIG. 4 is a diagram illustrating the principle of seamless reproduction.
Figure 5:
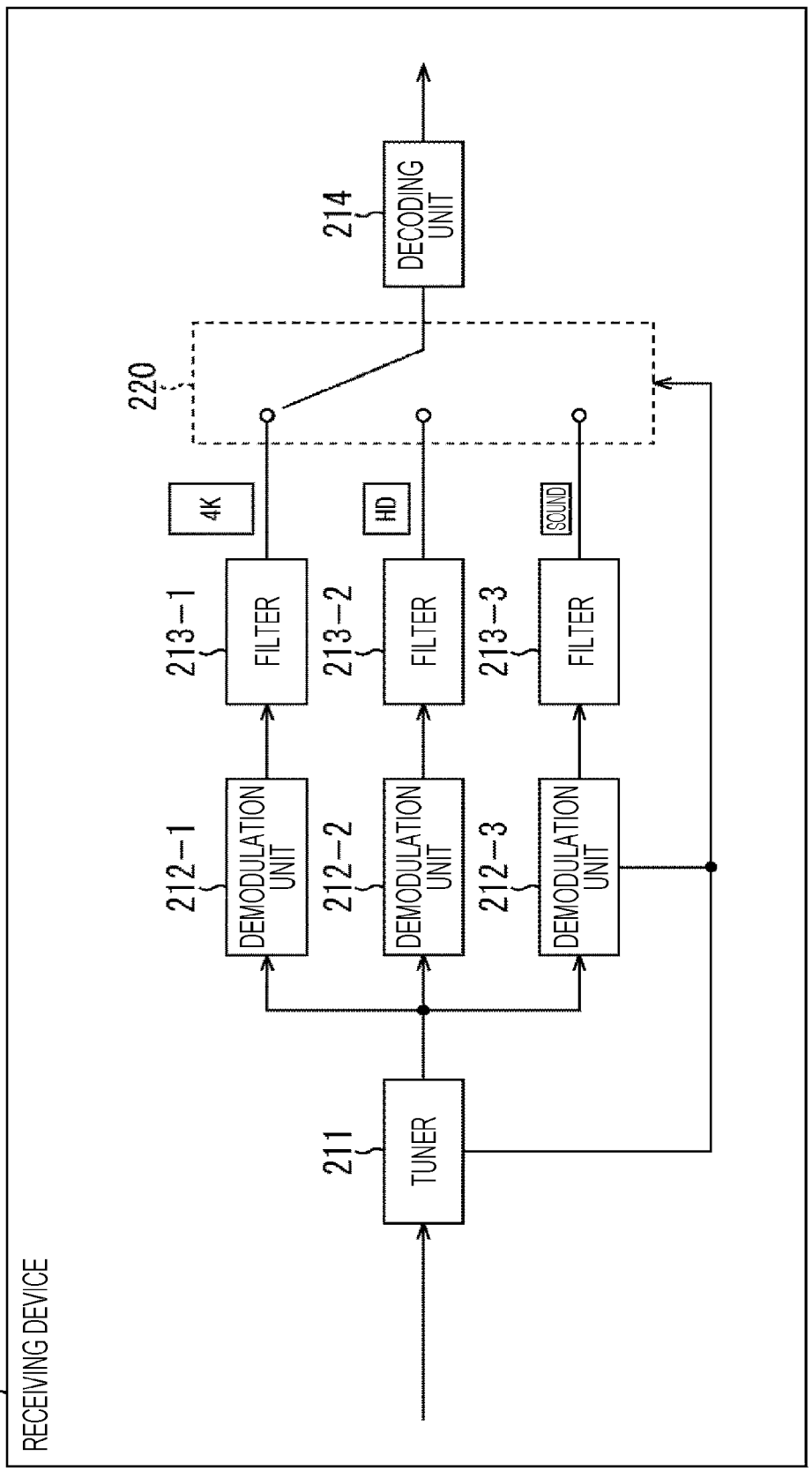
FIG. 5 is a diagram illustrating a configuration example of the receiving device that performs the seamless reproduction.

FIG. 4 illustrates a relationship between the quality of the received signal and a receivable broadcast signal when a horizontal axis is set to time, and a vertical axis is set to a carrier to noise ratio (a C/N ratio). In FIG. 4, the C/N ratio represented by a solid line L varies as time elapses.

In addition, in FIG. 4, three types of broadcast signals are prepared as the broadcast signal capable of being received by the receiving device 20, and necessary bit rate and robustness are different in each of the broadcast signals. That is, a broadcast signal of transmitting the 4K resolution video and the sound at a high bit rate and low robustness, is represented by "4K" in the drawing. In addition, a broadcast signal of transmitting the HD resolution video and the sound at an intermediate bit rate and intermediate robustness, is represented by "HD" in the drawings, and a broadcast signal of transmitting only the sound at a low bit rate and high robustness, is represented by "sound" in the drawing.

Furthermore, here, a specific value is not represented, but it is indicated that the bit rate increases in the order of a low bit rate, an intermediate bit rate, and a high bit rate. In addition, it is indicated that the robustness increases in the order of low robustness, intermediate robustness, and high robustness.

Here, in a case where the C/N ratio is high, the influence of the noise in the transmission decreases, and thus, the quality of the received signal is excellent. On the other hand, in a case where the C/N ratio is low, the influence of the noise increases, and thus, the quality of the received signal is poor. For this reason, as illustrated in FIG. 4, in a case where the C/N ratio is high, it is possible to receive the broadcast signals of "4K", "HD", and "sound", but in a case where the C/N ratio is low, it is possible to receive the broadcast signals of "HD" and "sound", and in a case where the C/N ratio becomes lower, it is possible to receive only the broadcast signal of the "sound".

Thus, in the receiving device 20, the receivable broadcast signal is changed according to the quality of the received signal, and thus, in a case where the quality of the received signal is excellent, it is not possible to receive a broadcast signal of "4K" in a case where the quality of the received signal is poor even when the broadcast signal of "4K" is received, and a broadcast signal of "HD" is received. On the contrary, in the receiving device 20, in a case where the quality of the received signal is slightly poor, it is possible to receive the broadcast signal of "4K" in a case where the quality of the received signal is excellent even when the broadcast signal of "HD" is received, and thus, the broadcast signal of "4K" is received.

That is, in the receiving device 20, the broadcast signal to be received is switched according to a variation in the C/N ratio, but for example, in a case where the 4K resolution video is switched to the HD resolution video, or in a case where the HD resolution video is switched to the 4K resolution video, there is a case where the disturbance occurs in the video or the sound, as described above. Then, in the present technology, the occurrence of the disturbance in the video or the sound at the time of switching the broadcast signal is suppressed, and the seamless reproduction can be performed.

In seamless reproduction control of the present technology, it is broadly divided into a case of using video boundary information which is information indicating a boundary (a random access point (RAP)) of a video, and a case of not using the video boundary information.

In the case of using the video boundary information, the video boundary information which is the information indicating of the boundary (RAP) of the video, is included in the signal processed on the physical layer. With this arrangement, in the receiving device 20, a broadcast signal of a target is switched on the basis of the video boundary information, and thus, the switching timing can be coincident with the boundary (RAP) of the video obtained from the signal processed on the higher layer. The case of using the video boundary information, will be described with reference to FIG. 6 to FIG. 19.

On the other hand, in the case of not using the video boundary information, all of a plurality of receivable broadcast signals are processed, and a signal of a decoding target is selected on the basis of information indicating the quality of the received signal, such as the C/N ratio, and information of an error rate or the like of the signal obtained in the demodulation processing. In FIG. 5, a configuration example of the receiving device 20 for realizing the case of not using the video boundary information, is illustrated. As illustrated in FIG. 5, in a case where the case of not using the video boundary information, is adopted, a plurality of systems of demodulation units 212 and filters 213 are required in order to process the plurality of broadcast signals. The case of not using the video boundary information, will be described with reference to FIG. 20.

<3. Seamless Reproduction Control of Present Technology>

Next, the seamless reproduction control of the present technology will be described, but here, first, the case of using the video boundary information will be described.

Here, in the video boundary information, for example, the position of a lead in a GOP cycle (the position of the I picture) can be included, as the boundary (RAP) of the video. With this arrangement, in the receiving device 20, the switching timing of the broadcast signal of the target can be coincident with the boundary (RAP) of the video of the boundary or the like of the GOP structure, according to the quality of the received signal.

(Example of Switching Timing of Broadcast Signal)

Figure 6:
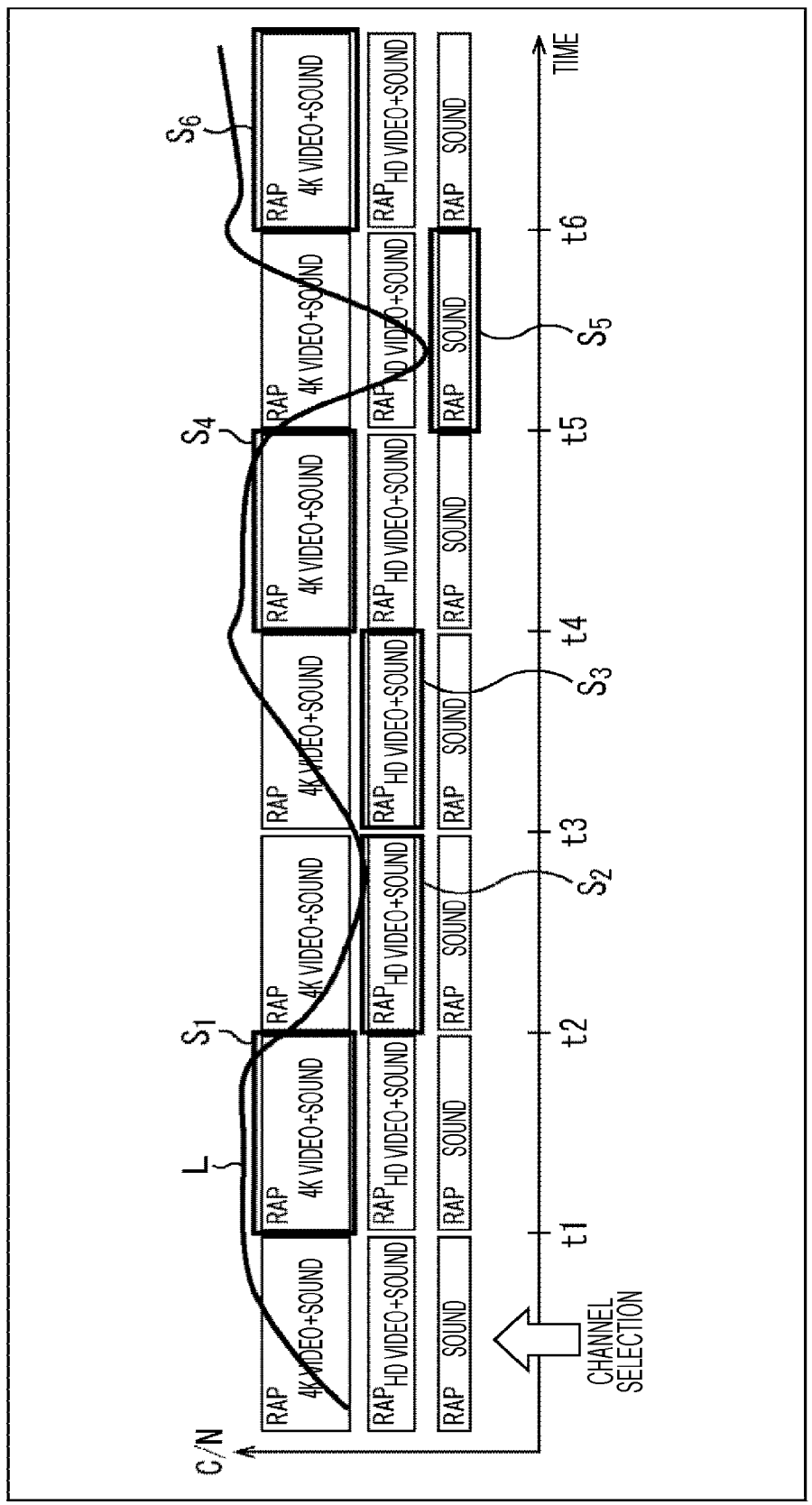
FIG. 6 is a diagram illustrating an example of the quality of a received signal, and a switching timing of a broadcast signal.

In FIG. 6, the quality of the received signal, and the switching timing of the broadcast signal when a horizontal axis is set to time, and a vertical axis is set to the C/N ratio, are illustrated.

In FIG. 6, the C/N ratio represented by the solid line L varies as time elapses, but a case is assumed in which a channel selection manipulation of a channel (a service) is performed by a user immediately before a time t1. In this case, the C/N ratio is high, and the quality of the received signal is excellent between the time t1 and a time t2, and thus, in the receiving device 20, the broadcast signal of "4K" ("$S_1$" in the drawing) is selected, and the 4K video and the sound is reproduced.

After that, when the C/N ratio gradually decreases, and the quality of the received signal becomes poorer at the time t2, in the receiving device 20, the broadcast signal of "4K" is switched to the broadcast signal of "HD" ("$S_2$" in the drawing), and thus, the HD video and the sound are reproduced. At this time, in the receiving device 20 (the demodulation unit 212 or the like thereof), the video boundary information is included in the signal processed on the physical layer, and thus, the signal processed on the physical layer is switched at a timing according to the video boundary information, and the timing is coincident with the boundary of the video (for example, the boundary of the GOP structure) to be obtained from the signal processed on the higher layer.

With this arrangement, in the receiving device 20, in the decoding unit 214 on the subsequent stage, the video signal and the sound signal can be continuously decoded, and as a result thereof, it is possible to perform the seamless reproduction at the time of switching the broadcast signal of "4K" ("$S_1$" in the drawing) to the broadcast signal of "HD" ("$S_2$" in the drawing).

After that, in the receiving device 20, the broadcast signal of "HD" ("$S_2$" and "$S_3$" in the drawing) is continuously selected according to the quality of the received signal, between the time t2 and a time t4, and thus, the HD video and the sound are reproduced.

In addition, when the C/N ratio increases, and the quality of the received signal becomes more excellent at the time t4, in the receiving device 20, the broadcast signal of "HD" ("S$_3$" in the drawing) is switched to the broadcast signal of "4K" ("S$_4$" in the drawing), and thus, the 4K video and the sound are reproduced. At this time, in the receiving device 20 (the demodulation unit 212 or the like thereof), the signal processed on the physical layer is switched at a timing according to the video boundary information included in the signal processed on the physical layer, and thus, the timing is coincident with the boundary of the video (for example, the boundary of the GOP structure) to be obtained from the signal processed on the higher layer.

With this arrangement, in the receiving device 20, in the decoding unit 214 on the subsequent stage, the video signal and the sound signal can be continuously decoded, and as a result thereof, it is possible to perform the seamless reproduction at the time of switching the broadcast signal of "HD" ("S$_3$" in the drawing) to the broadcast signal of "4K" ("S$_4$" in the drawing).

In the subsequent time zone, the same operation is repeated, and thus, the description thereof will be omitted, but in the receiving device 20, when the broadcast signal is switched according to the quality of the received signal, the broadcast signal is switched according to the video boundary information included in the signal processed on the physical layer, and thus, the switching timing of the broadcast signal can be coincident with the boundary (RAP) of the video, and the seamless reproduction can be performed.

Thus, in the receiving device 20, it is possible to perform the seamless reproduction by using the video boundary information. Here, the video boundary information, for example, can be included in a preamble of a physical frame, a header of a packet of a physical layer (a packet of a baseband after being demodulated), additional information associated with a broadcast, and the like, as the signal processed on the physical layer. Hereinafter, a control method according to an arrangement position of the video boundary information will be described.

(1) Control in Physical Frame Unit (Relationship Between Physical Frame and Video Signal)

Figure 7:
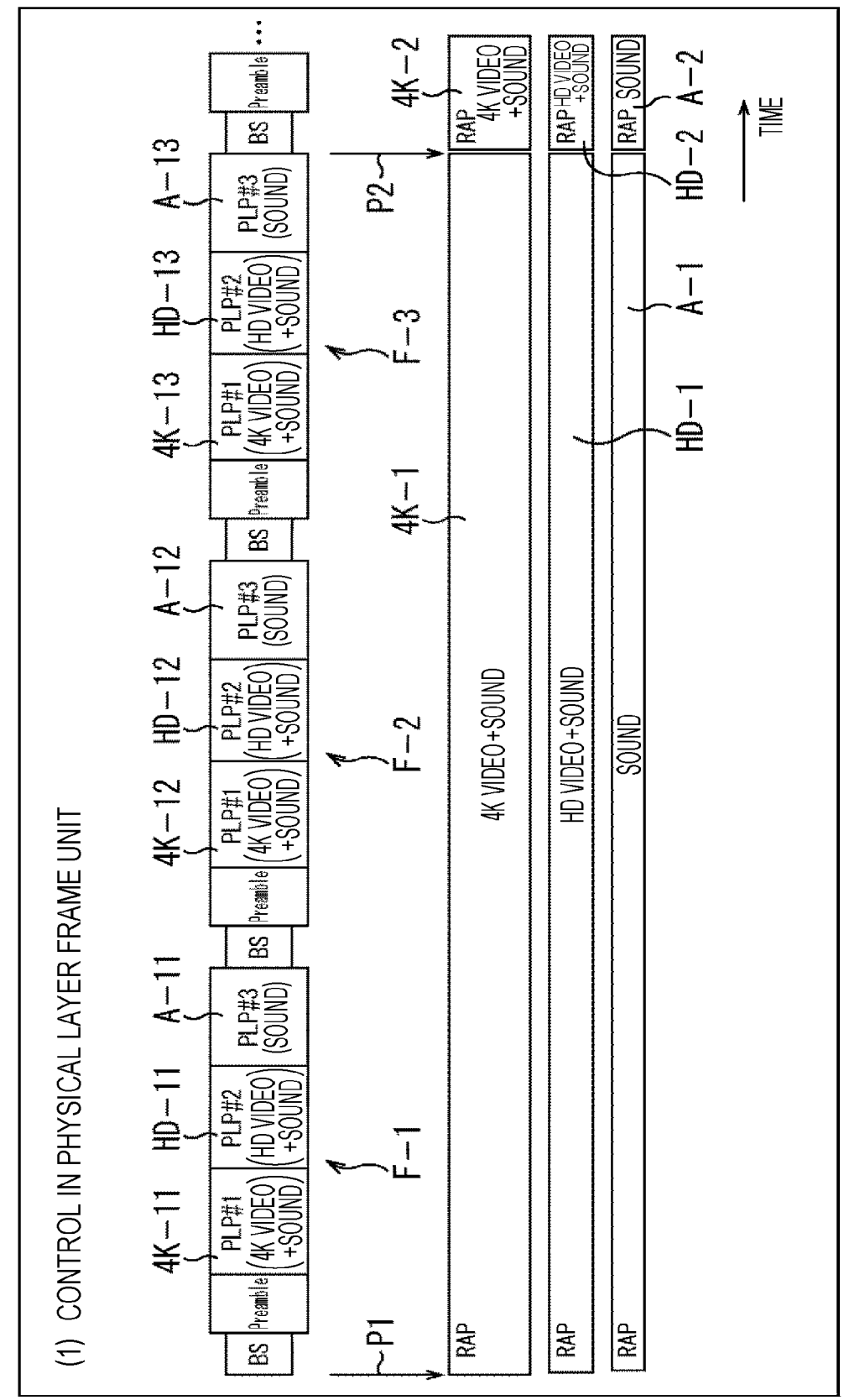
FIG. 7 is a diagram illustrating a relationship between a physical frame and a video signal in a case of performing control in physical frame unit.

FIG. 7 is a diagram illustrating a relationship between the physical frame and the video signal in a case of switching the broadcast signal according to the quality of the received signal, in physical frame unit which is unit for transmitting data.

Here, the configuration of the physical frame is illustrated in the upper portion of FIG. 7, and the configuration of the video signal is illustrated in the lower portion of FIG. 7. In addition, in FIG. 7, a direction of time is a direction directed towards the right side from the left side in the drawing. Furthermore, such a relationship is similar to that in other corresponding drawings as described later.

In FIG. 7, in order to transmit three types of broadcast signals, streams of a video signal of "4K" and the sound signal, a video signal of "HD" and the sound signal, and a sound signal of "sound" are respectively prepared. That is, such a stream is a stream of the same or corresponding contents. In such a stream, a position represented by arrows P1 and P2 in the drawing, for example, is the boundary of the video ("RAP" in the drawing) such as the position of the lead (the position of the I picture) in the GOP cycle.

Such a stream is transmitted in the physical frame unit in a case of being transmitted as the broadcast signal. For example, in the ATSC 3.0, the physical frame is configured of a bootstrap (Bootstrap: BS), a preamble (Preamble), and a data portion (Data).

Furthermore, the bootstrap, for example, corresponds to a P1 symbol configuring a T2 frame of digital video broadcasting-second generation terrestrial (DVB-T2), and the preamble, for example, corresponds to a P2 symbol configuring a T2 frame of DVB-T2. Therefore, the bootstrap can be referred to as the preamble. In addition, a frame length of the physical frame, for example, is 100 ms to 200 ms.

In the physical frame, data is included for each physical layer pipe (PLP), in the data portion.

That is, the stream of the video signal of "4K" and the sound signal is transmitted as PLP of PLPID, which is "1" (hereinafter, also referred to as PLP#1). Then, in a stream of "4K" to be transmitted as PLP#1, data 4K-1 in which a position represented by the arrow P1 in the drawing, is the boundary (RAP) of the video, is divided into data 4K-11, data 4K-12, and data 4K-13, according to a time axis, and the data 4K-11, the data 4K-12, and the data 4K-13 are respectively included in data portions of physical frames F-1 to F-3.

The stream of the video signal of "HD" and the sound signal, is transmitted as PLP of PLPID, which is "2" (hereinafter, also referred to as PLP#2). Then, in a stream of "HD" to be transmitted as PLP#2, data HD-1 in which a position represented by the arrow P1 in the drawing, is the boundary (RAP) of the video, is divided into data HD-11, data HD-12, and data HD-13, according to a time axis, and the data HD-11, the data HD-12, and the data HD-13 are respectively included in the data portions of the physical frames F-1 to F-3.

The stream of the sound signal of "sound", is transmitted as PLP of PLPID, which is "3" (hereinafter, also referred to as PLP#3). Then, in a stream of "sound" to be transmitted as PLP#3, data A-1 in which a position represented by the arrow P1 in the drawing, is a position corresponding to the boundary (RAP) of the video, is divided into data A-11, data A-12, and data A-13, according to a time axis, and the data A-11, data A-12, and data A-13 are respectively included in the data portions of the physical frames F-1 to F-3.

Furthermore, the same operation is repeated, and thus, the description thereof will be omitted, but similarly, in data 4K-2, data HD-2, and data A-2 in which a position represented by the arrow P2 in the drawing is the boundary (RAP) of the video, the divided data is included in the physical frame (not illustrated) after the physical frame F-3.

Thus, in an example of FIG. 7, a relationship is obtained in which the cycle of the boundary of the video (for example, the GOP cycle) is equal to an integer multiple of the cycle of the physical frame. For this reason, for example, the video boundary information indicating the boundary (RAP) of the video is included in the preamble of the physical frame (the physical frame F-1) including data (the data items 4K-11, HD-11, and A-11) corresponding to the boundary (RAP) of the video, such as the lead of the GOP cycle (the I picture), and thus, it is possible to indicate that the physical frame (the physical frame F-1) includes the data corresponding to the boundary (RAP) of the video.

With this arrangement, in the receiving device 20, for example, the physical frame F-1 including the video boundary information is processed in a case of switching the broadcast signal according to the quality of the received signal, and thus, the switching timing is coincident with the boundary ("RAP" in the drawing) of the video of the data 4K-1 or the data HD-1 processed on the higher layer (the position represented by the arrow P1 in the drawing). As a result thereof, in the receiving device 20, for example, when the broadcast signal of "4K" is switched to the broadcast signal of "HD", or the broadcast signal of "HD" is switched to the broadcast signal of "4K", the seamless reproduction can be performed.

In addition, the video boundary information included in the preamble of the physical frame is used, and thus, for example, it is possible to perform the seamless reproduction by only operating a circuit of one system (the demodulation unit 212 and the filter 213), and therefore, low power consumption can be realized by minimally operating the circuit. For example, in demodulation LSI, a circuit size is large, and the power consumption is high, and thus, the effect of low power consumption extremely increases according to a minimal operation of only the circuit of one system.

Furthermore, the details will be described later, but in the ATSC 3.0, in a case where ROUTE is used as a transport protocol, streaming delivery based on MPEG-DASH is performed, and in the MPEG-DASH, the stream of the video or the sound is transmitted as a segment file. Then, the segment file includes the random access point (RAP) on the lead, and thus, in the example of FIG. 7, the boundary (RAP) of the video corresponds to the lead of the segment file, and the switching is performed in segment file unit, and thus, the seamless reproduction can be performed.

(Example of Data Structure)

However, an internet protocol (IP) packet which is used in the field of communication, but not an MPEG2-transport stream (TS) method which is currently and widely used, is introduced to an IP transmission system used for a digital television broadcast, as the transmission system, and thus, it is expected that a more advanced service is provided. For example, in the ATSC 3.0 that is one of next-generation terrestrial broadcast standards, it is determined that the IP transmission system is adopted.

Figure 8:
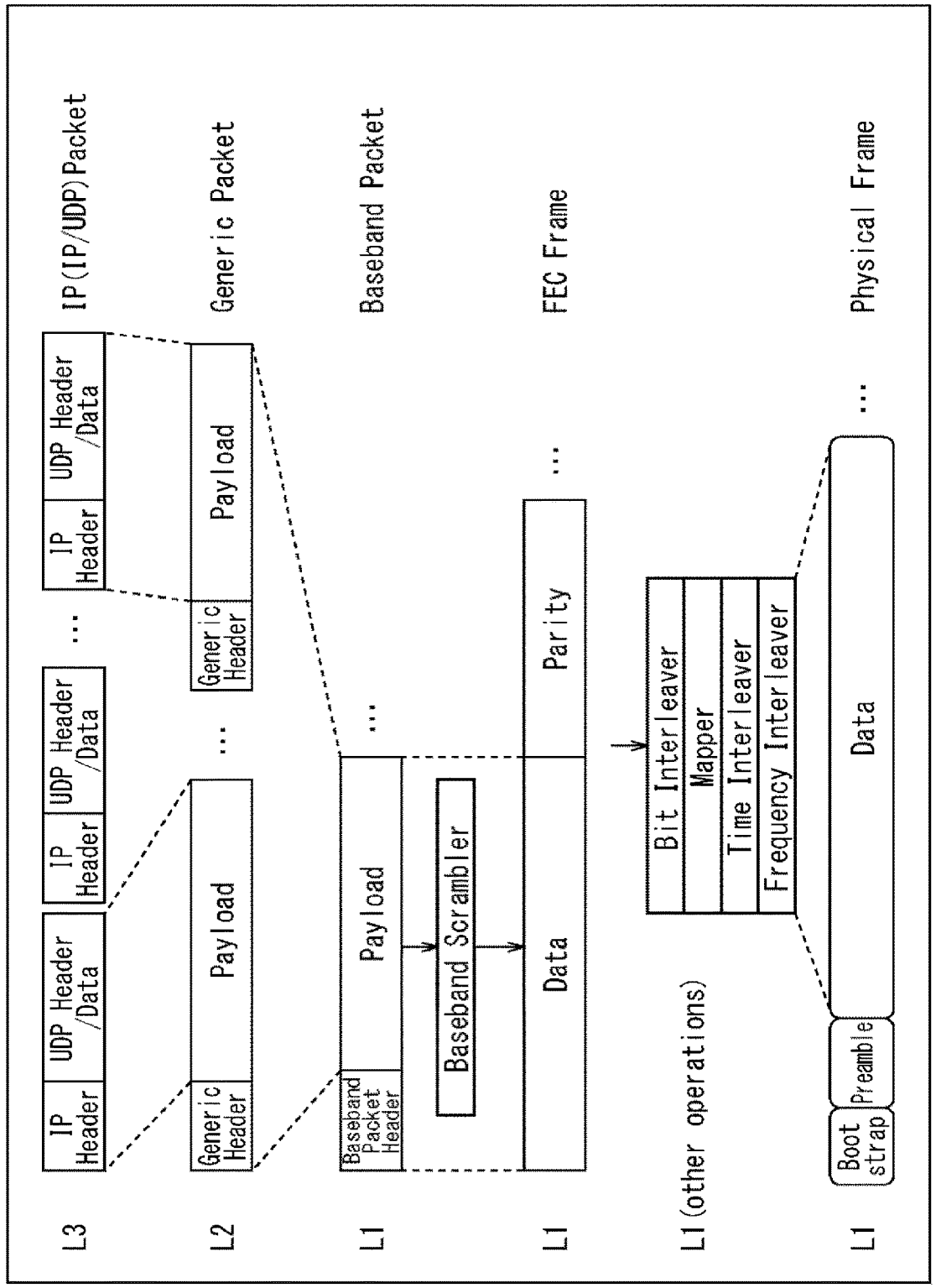
FIG. 8 is a diagram illustrating an example of a data structure for each layer in a case of adopting an IP transmission system.

FIG. 8 is a diagram illustrating an example of a data structure for each layer in a case where the IP transmission system is adopted.

In FIG. 8, a layer 1 (L1) which is a physical layer, a layer 2 (L2) which is a higher layer of the layer 1, and a layer 3 (L3) which is a higher layer of the layer 2, configure a hierarchy structure.

An IP packet is processed as the data of the layer 3. The IP packet includes an IP header (IP Header) and a payload (Payload). A UDP packet is stored in the payload of the IP packet. That is, the IP packet can be an IP/UDP packet. The data of the video or the sound of the contents, data of the signaling as the control information, and the like are stored in the payload of the IP/UDP packet.

A generic packet is processed as the data of the layer 2. The generic packet includes a generic header (Generic Header) and a payload (Payload). One or a plurality of IP/UDP packets are arranged in the payload of the generic packet, and are encapsulated (encapsulation).

A BB packet (Baseband Packet) is processed as the data of the layer 1. The BB packet includes a BBP header (Baseband Packet Header) and a payload (Payload). One or a plurality of generic packets are arranged in the payload of the BB packet, and are encapsulated. In addition, in the layer 1, data (Data) to be obtained by scrambling one or a plurality of BB packets is mapped in an FEC frame (FEC Frame), and a parity (Parity) for error correction of the physical layer is added.

Here, the physical frame (Physical Frame) of the layer 1 includes a bootstrap (Bootstrap), a preamble (Preamble), and a data portion (Data). Then, data to be obtained by performing processing of the physical layer (the modulation processing) such as mapping processing with respect to a plurality of FEC frames after bit-interleaving, and interleaving in a time direction and a frequency direction, is mapped in the data portion of the physical frame.

Signaling is included in the preamble of the physical frame. For example, in the ATSC 3.0, L1 signaling is defined as the signaling included in the preamble. The L1 signaling includes L1 basic information (L1 Basic Signaling) and L1 detail information (L1 Detail Signaling).

Here, in a case of comparing the L1 basic information with the L1 detail information, the L1 basic information is different from the L1 detail information in the size, from the viewpoint that the L1 basic information is configured of approximately 200 bits, and the L1 detail information is configured of 400 bits to a few thousand bits. In addition, the L1 basic information and the L1 detail information are readout in the preamble of the physical frame, in this order, and thus, the L1 basic information is read out earlier than the L1 detail information. Further, the L1 basic information is different from the L1 detail information in that the L1 basic information is more robustly transmitted than the L1 detail information.

(Configuration of L1 Basic Information)

FIG. 9 is a diagram illustrating an example of a syntax of the L1 basic information (L1 Basic Signaling).

Furthermore, the detailed contents of the L1 basic information are described in "Table 9.2 L1-Basic Signaling Fields and Syntax" of Non-Patent Document 1 described below. For this reason, in particular, a portion of the L1 basic information, which is relevant to the present technology, is selectively described in the syntax of FIG. 9.

Non-Patent Document 1: ATSC Candidate Standard: Physical Layer Protocol (A/322) Doc. S32-230r45 6 Apr. 2016

L1B_RAP_EXIST_FLAG of 1 bit is a flag indicating whether or not the video boundary information exists in the L1 detail information.

For example, in a case where "0" is set as L1B_RAP_EXIST_FLAG, it is indicated that the video boundary information is not included in the L1 detail information. On the other hand, in a case where "1" is set as L1B_RAP_EXIST_FLAG, it is indicated that the video boundary information is included in the L1 detail information.

Here, the description other than L1B_RAP_EXIST_FLAG is omitted.

(Configuration of L1 Detail Information)

FIG. 10 is a diagram illustrating an example of a syntax of the L1 detail information (L1 Detail Signaling).

Furthermore, the detailed contents of the L1 detail information are described in "Table 9.8 L1-Detail Signaling Fields and Syntax" of Non-Patent Document 1 described above. For this reason, in particular, a portion of the L1 detail information, which is relevant to the present technology, is selectively described in the syntax of FIG. 10.

For example, in the L1 basic information of FIG. 9, in a case where "1" is set as L1B_RAP_EXIST_FLAG, it is indicated that the video boundary information exists, and thus, in the L1 detail information of FIG. 10, as the video boundary information, RAP of 1 bit and AdaptationSet of 8 bits are arranged.

The RAP of 1 bit is a flag indicating that the boundary (RAP) of the video is included in the corresponding physical frame. For example, in a case where "0" is set as the RAP, it is indicated that the boundary (RAP) of the video is not included in the corresponding physical frame.

On the other hand, in a case where "1" is set as the RAP, it is indicated that the boundary (RAP) of the video is included in the corresponding physical frame. That is, in this case, for example, the data of the I picture to be arranged in the position of the lead of the GOP cycle, is included in a data portion of the corresponding physical frame.

AdaptationSet including the boundary (RAP) of the video is designated as the AdaptationSet of 8 bits. Here, the AdaptationSet corresponds to AdaptationSet element described in media presentation description (MPD) metadata, which is used for performing streaming delivery based on dynamic adaptive streaming over HTTP (MPEG-DASH).

That is, in the MPD metadata, a Period element, an AdaptationSet element, a Representation element, and the like are described in a hierarchy structure. The Period element is unit for describing the configuration of the contents of the broadcast program or the like. The AdaptationSet element or the Representation element is used for each of the streams of the video or the sound, the caption, or the like, and are capable of describing the attribution of each of the streams.

Specifically, the AdaptationSet element indicates a stream which is encoded from various sources. Then, the Representation element is arranged in the AdaptationSet element, and for example, streams to be a plurality of options having different parameters such as the bit rate, are enumerated, such that the stream, for example is selected on the receiving device 20 side according to a parameter such as a bit rate. In general, the AdaptationSet element or the Representation element corresponds to a single stream such as the stream of the video or the sound, the caption, or the like.

For example, in the ATSC 3.0, it is assumed that real-time object delivery over unidirectional transport (ROUTE) is used as the transport protocol, and in such a case, streaming delivery based on MPEG-DASH is performed. In this case, it is possible to specify the stream including the boundary (RAP) of the video, according to the AdaptationSet arranged in the L1 detail information.

Here, the description other than the RAP and the AdaptationSet is omitted.

Furthermore, in FIG. 9 and FIG. 10, in a case where unsigned integer most significant bit first (uimsbf) is designated as a format (Format), it is indicated that a bit is handled as an integer according to a bit operation.

(Relationship Between Physical Layer and Higher Layer)

Figure 11:
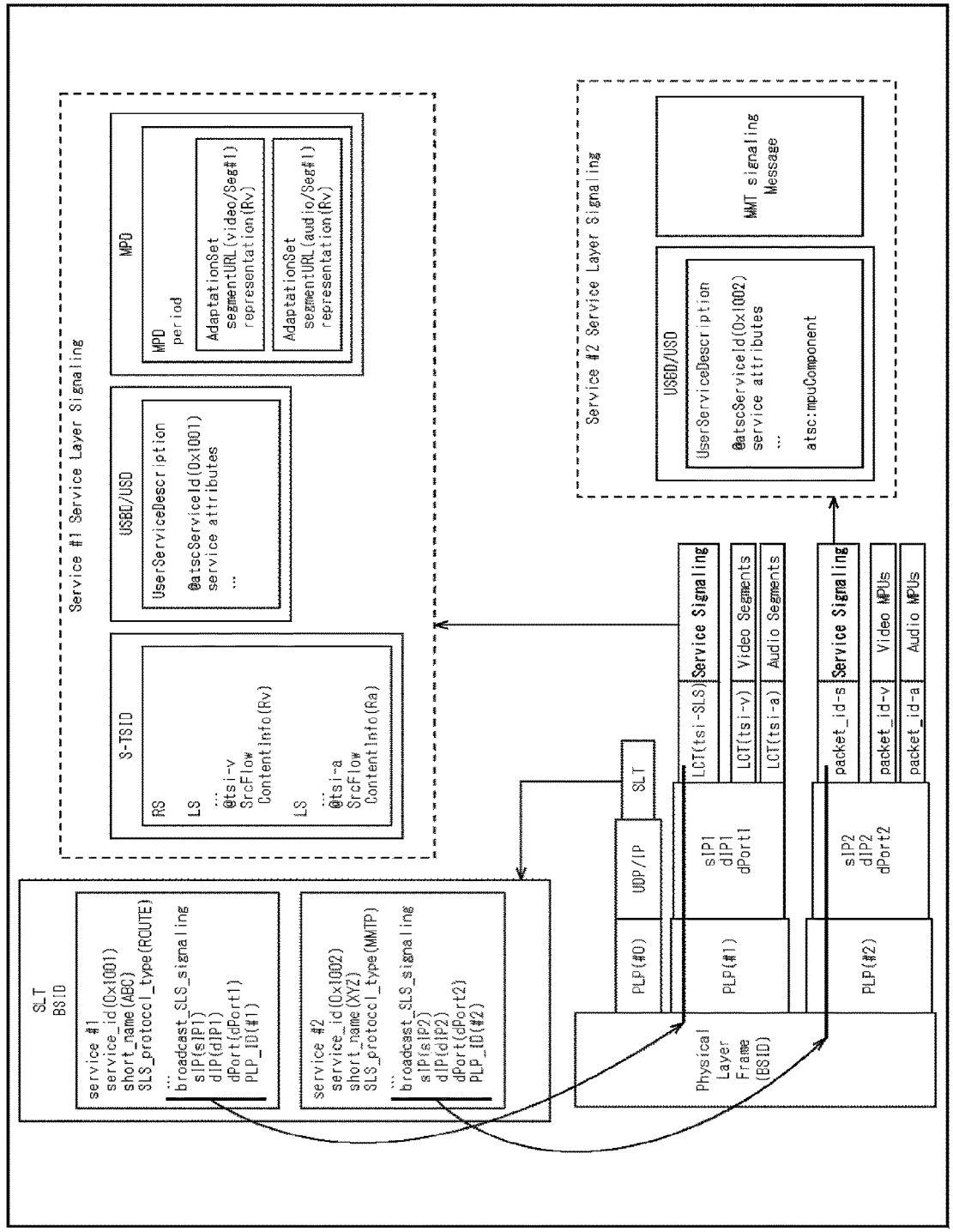
FIG. 11 is a diagram illustrating a relationship between a physical layer and data handled in a higher layer.

FIG. 11 is a diagram illustrating a relationship between the physical layer and the data to be handled in the higher layer.

As described above, in the ATSC 3.0, it is assumed that real-time object delivery over unidirectional transport (ROUTE) is used as the transport protocol. Here, the ROUTE is a protocol extending file delivery over unidirectional transport (FLUTE) which is a protocol suitable for multicast-transferring binary file in one direction. It is possible to transmit the components of the video or the sound, and the caption, the signaling, and the like, by using a ROUTE session.

In FIG. 11, PLP#0, PLP#1, and PLP#2 are included in a broadcast stream (Broadcast Stream) of a predetermined frequency band (for example, 6 MHz). PLP#0 includes a stream of low level signaling (LLS). Here, the stream of LLS is transmitted by being stored in an IP packet.

Here, in the ATSC 3.0, low level signaling (LLS) and service layer signaling (SLS) are defined as the signaling. The LLS is signaling which is acquired preceding the SLS, and the SLS is acquired for each service, according to information included in the LLS. For example, metadata such as a service list table (SLT) is included as the LLS. The SLT metadata includes basic information indicating a configuration of a stream or a service in a broadcast network, such as information necessary for channel selection of the service.

PLP#1, for example, includes a stream of "4K" which is provided as Service#1. The stream of "4K" includes a video signal (Video Segments), a sound signal (Audio Segments), and service signaling (SLS), and is specified by an IP address or a port number, a PLP ID, and the like, which are included in the SLT metadata.

The SLS is signaling of service unit. The SLS includes metadata such as user service bundle description (USBD), service-based transport session instance description (S-TSID), and media presentation description (MPD).

The USBD metadata includes information such as an acquisition destination of the other metadata.

The S-TSID metadata is obtained by extending LCT session instance description (LSID) for the ATSC 3.0, and is control information of a ROUTE protocol. In addition, the S-TSID metadata is capable of specifying extended FDT (EFDT) which is transmitted by the ROUTE session. The EFDT is obtained by extending a file delivery table (FDT) which is introduced by the FLUTE, and is control information for transfer.

The MPD metadata is control information of a file of a video or a sound, which is used for performing streaming delivery based on MPEG-DASH, as described above. Here, the MPEG-DASH is a streaming delivery standard according to over the top video (OTT-V), and is a standard relevant to adaptive streaming delivery using a streaming protocol based on a hypertext transfer protocol (HTTP).

In the standard of the MPEG-DASH, a manifest file for describing the metadata which is the control information of the file of the video or the sound, and a file format for transmitting the contents of a moving image are defined. Here, the former manifest file will be also referred to as media presentation description (MPD), and the latter file format will be also referred to as a segment format.

In addition, in a case where the ROUTE is used as the transport protocol, it is assumed that an MP4 file format is used as a streaming file format. The MP4 file format is a derived format of an ISO base media file format (ISOBMFF) which is defined by ISO/IEC 14496-12.

In the receiving device 20, a stream of a reproduction target is specified from an IP address or a port number, and a PLP ID from a service (Service#1), which is a channel selection target, according to the SLT metadata acquired in advance, at the time of selecting the channel. In addition, in the receiving device 20, the MPD metadata or the S-TSID metadata, which is transmitted by the SLS channel in the LCT channel of the ROUTE session, is analyzed with respect to the stream of the reproduction target, and as an analysis result thereof, a stream (a segment file) of a video and a sound, which are transmitted by an audio video (AV) channel, is acquired. With this arrangement, in the receiving device 20, a 4K video and a sound, which are provided as Service#1, are reproduced.

Furthermore, in the ATSC 3.0, it is also assumed that MPEG media transport (MMT) is used as the transport protocol, along with the ROUTE. In an example of FIG. 11, in PLP#2, a service which is provided as Service#2, corresponds to an MMT method.

As described above, in the control in the physical frame unit, the video boundary information indicating the boundary (RAP) of the video is included in the preamble of the physical frame, as the L1 signaling, and thus, in the receiving device 20, the broadcast signal of the target is switched on the basis of the video boundary information, and therefore, the switching timing can be coincident with the boundary (RAP) of the video to be obtained from the signal processed on the higher layer. With this arrangement, in the receiving device 20, it is possible to perform the seamless reproduction at the time of switching the broadcast signal.

Furthermore, in the above description of the control in the physical frame unit, for example, a case where time division multiplexing (TDM) is adopted as a multiplexing method of a plurality of broadcast signals, such as the ATSC 3.0, is described, and the control can be similarly performed in frequency division multiplexing (FDM).

That is, in a case where the frequency division multiplexing (FDM) is adopted, a predetermined frequency band (for example, 6 MHz) is frequency-divided into a plurality of segments, and hierarchy transmission using a band for one segment or each of the plurality of segments, is performed.

In this case, for example, the same or corresponding contents such as "4K", "HD", and "sound", can be transmitted for each hierarchy including frequency bands of one or the plurality of segments, which is obtained by the frequency division.

Then, even in a case where such frequency division multiplexing (FDM) is adopted, the video boundary information which is the information indicating the boundary (RAP) of the video, is included as the signaling of the physical frame, and thus, in the receiving device 20, the broadcast signal of the target is switched on the basis of the video boundary information, and therefore, the switching timing can be coincident with the boundary (RAP) of the video to be obtained from the signal processed on the higher layer.

For example, in the ISDB-T, the frequency division multiplexing (FDM) is adopted, a frequency band (6 MHz) of one channel is frequency-divided into 13 segments, a broadcast signal of a one-segment broadcast for a mobile receiver is transmitted by using a frequency band of one segment in the center, and a broadcast signal of a broadcast for a fixed receiver is transmitted by using frequency bands of 12 remaining segments. Even in such a case, the video boundary information which is the information indicating the boundary (RAP) of the video, is used, and thus, for example, in the mobile receiver, at the time of switching the broadcast signal of the full-segment broadcast and the broadcast signal of the one-segment broadcast according to the reception environment, it is possible to perform the seamless reproduction without causing the disturbance to occur in the video or the sound.

(2-1) Control in BB Packet Unit (TDM)

However, in the control in the physical frame unit described above, the video boundary information is included in the L1 signaling of the preamble, on the premise of a relationship in which the cycle of the boundary of the video (for example, the GOP cycle) is equal to the integer multiple of the cycle of the physical frame. However, in a case where the cycle of the boundary of the video is different from the integer multiple of the cycle of the physical frame, it is not possible to perform the control in the physical frame unit. Therefore, next, a control method in a case where the cycle of the boundary of the video is not the integer multiple of the cycle of the physical frame, will be described.

Here, as described above, the time division multiplexing (TDM) and the frequency division multiplexing (FDM) are exemplified as a multiplexing method of the plurality of broadcast signals, and first, a control method in a case of adopting the time division multiplexing (TDM), will be described with reference to FIG. 12 to FIG. 17, and then, a control method in a case of adopting the frequency division multiplexing (FDM) will be described with reference to FIG. 18 to FIG. 19.

(Relationship Between Physical Frame and Video Signal)

Figure 12:
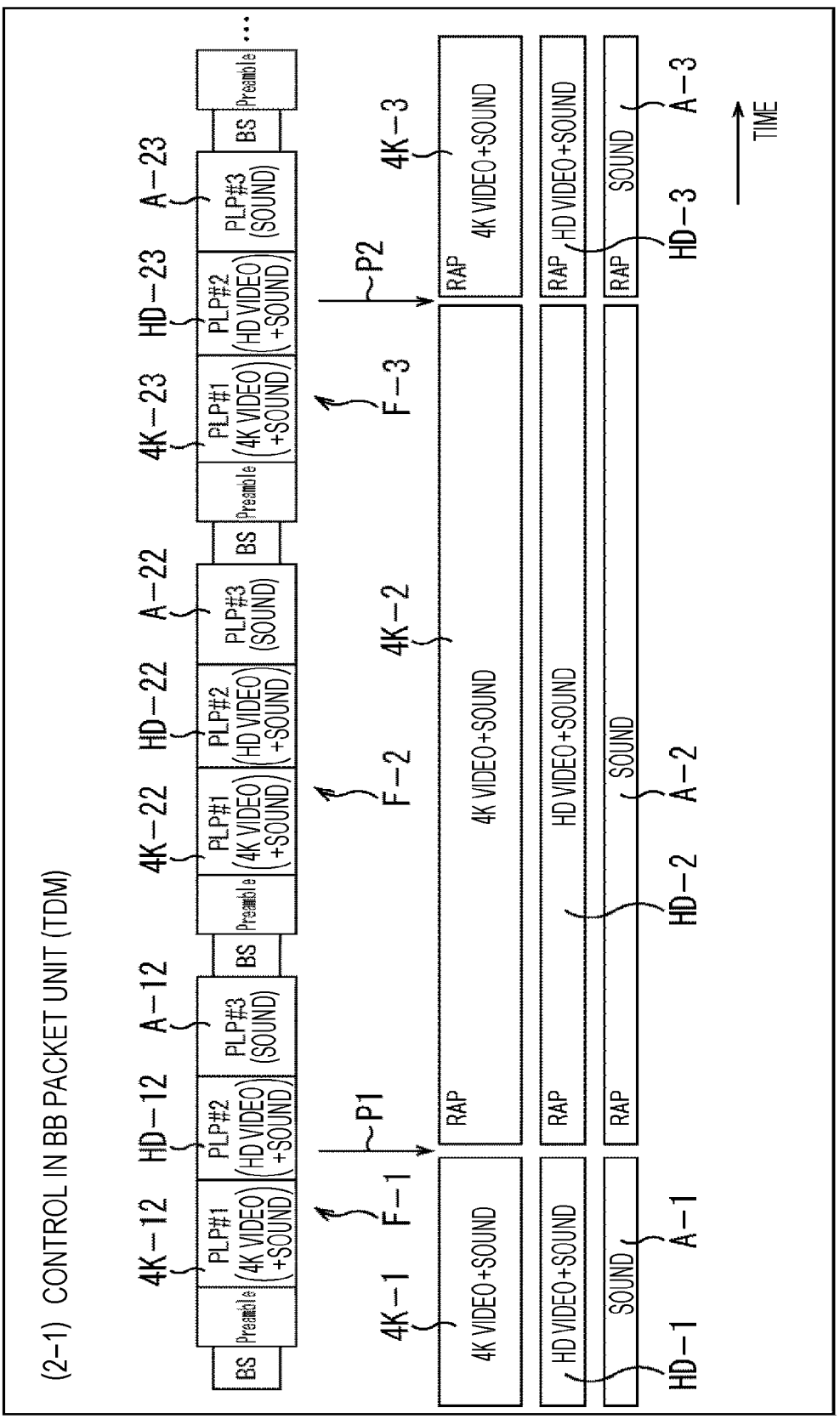
FIG. 12 is a diagram illustrating a relationship between a physical frame and a video signal in a case of performing control in BB packet unit.

FIG. 12 is a diagram illustrating a relationship between the physical frame and the video signal, in a case where the switching of the broadcast signal according to the quality of the received signal, is performed in BB packet unit which is the packet of the baseband after being demodulated.

In FIG. 12, in order to transmit three types of broadcast signals, each of the streams of the video signal of "4K" and the sound signal, the video signal of "HD" and the sound signal, and the sound signal of "sound" is prepared. That is, such a stream is the stream of the same or corresponding contents. In such a stream, a position represented by arrows P1 and P2 in the drawing, is the boundary of the video ("RAP" in the drawing), such as the position of the lead (the position of the I picture) in the GOP cycle.

That is, the stream of "4K" to be transmitted as PLP#1, is a GOP cycle which is different for each boundary (RAP) of the video represented by the arrows P1 and P2, and thus, for example, the data 4K-1, the data 4K-2, and the data 4K-3 are data items for different GOP cycles. Similarly, in the stream of "HD" to be transmitted as PLP#2, data HD-1, data HD-2, and data HD-3 are data items for different GOP cycles.

Here, in an example of FIG. 12, in the stream of "4K", the data 4K-2 is divided along a time axis, and is included in each of the data portions of the physical frames F-1 to F-3, but the GOP cycle is not coincident with the integer multiple of the cycle of the physical frame, and thus, data of a part of the data 4K-1 is included in the data 4K-12 of the physical frame F-1, in addition to the data 4K-2, as the data of PLP#1.

In addition, only the data of the data 4K-2 is included in data 4K-22 of the physical frame F-2, as the data of PLP#1. Further, data of a part of the data 4K-3 is included in data 4K-23 of the physical frame F-3, in addition to the data 4K-2, as the data of PLP#1.

In the stream of "HD", the data HD-2 is divided along a time axis, and is included in each of the data portions of the physical frames F-1 to F-3, but the GOP cycle is not coincident with the integer multiple of the cycle of the physical frame, and thus, data of a part of the data HD-1 is included in the data HD-12 of the physical frame F-1, in addition to the data HD-2, as the data of PLP#2.

In addition, only the data of the data HD-2 is included in data HD-22 of the physical frame F-2, as the data of PLP#2. Further, data of a part of the data HD-3 is included in the data HD-23 of the physical frame F-3, in addition to the data HD-2, as the data of PLP#2.

In the stream of "sound", the data A-2 is divided along a time axis, and is included in each of the data portions of the physical frames F-1 to F-3, but the GOP cycle is not coincident with the integer multiple of the cycle of the physical frame, and thus, data of a part of the data A-1 is included in the data A-12 of the physical frame F-1, in addition to the data A-2, as the data of PLP#3.

In addition, only the data of the data A-2 is included in data A-22 of the physical frame F-2, as the data of PLP#3. Further, data of a part of the data A-3 is included in data A-23 of the physical frame F-3, in addition to the data A-2, as the data of PLP#3.

Thus, in the example of FIG. 12, a relationship is obtained in which the cycle of the boundary of the video (the GOP cycle) is not coincident with the integer multiple of the cycle of the physical frame. In this case, even in a case of performing the control in the physical frame unit described above, the switching timing of the signal processed on the physical layer is not capable of being coincident with the boundary of the video (the boundary of the GOP structure) to be obtained from the signal processed on the higher layer.

Therefore, here, the control is performed in the BB packet unit which is unit narrower than the physical frame unit, and thus, even in a case where the cycle of the boundary of the video (GOP cycle) is not coincident with the integer multiple of the cycle of the physical frame, the switching timing of the signal processed on the physical layer can be coincident with the boundary of the video (the boundary of the GOP structure) to be obtained from the signal processed on the higher layer.

(Relationship Between BB Packet and Video Signal)

Figure 13:
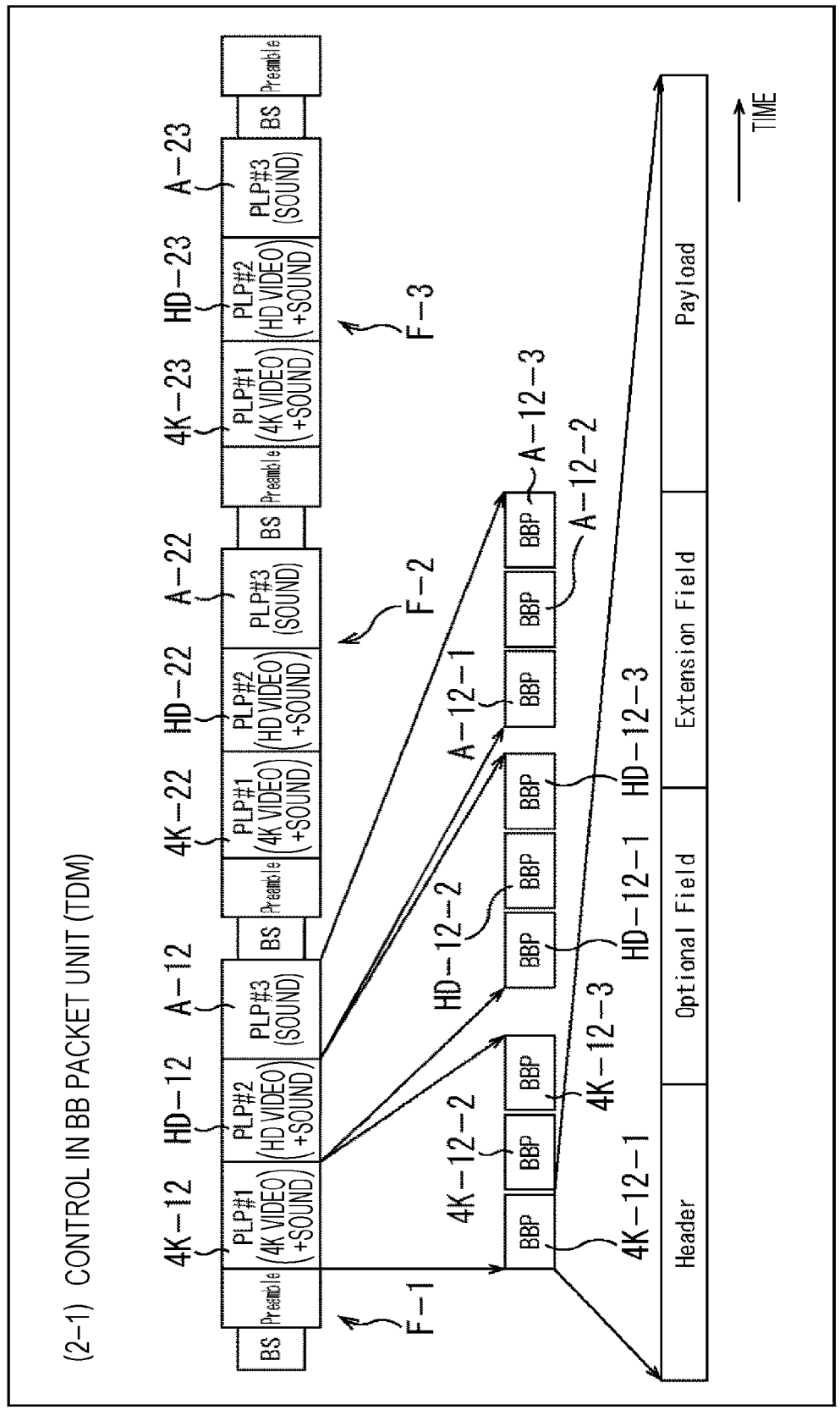
FIG. 13 is a diagram illustrating a relationship between a BB packet and a video signal in a case of performing control in BB packet unit.

FIG. 13 is a diagram illustrating a relationship between the BB packet and the video signal, in a case where the switching of the broadcast signal according to the quality of the received signal, is performed in the BB packet unit which is the packet of the baseband after being demodulated.

In FIG. 13, the physical frames F-1 to F-3 in the upper portion, correspond to the physical frames F-1 to F-3 illustrated in FIG. 12.

That is, the data of the data 4K-1 and the data 4K-2 in the stream of "4K", is included in the data 4K-12 of the physical frame F-1, as the data of PLP#1. In addition, in the physical frame F-1, the data of the data HD-1 and the data HD-2 in the stream of "HD", is included in the data HD-12, as the data of PLP#2, and the data of data A-1 and the data A-2 in the stream of "sound", is included in the data A-12, as the data of PLP#3.

The same applies to the subsequent physical frame of the physical frame F-1, such as the physical frame F-2 or the physical frame F-3, and the data of the stream of "4K", "HD", and "sound" is included as data within the same GOP cycle or data over the GOP cycle.

Here, focusing on the physical frame F-1, the data 4K-12 included in the data portion, corresponds to a BB packet 4K-12-1, a BB packet 4K-12-2, and a BB packet 4K-12-3. That is, as illustrated in FIG. 8 described above, the BB packet is the packet of the layer 1 (the physical layer), and is one or a plurality of packets (the packet of the baseband after being demodulated) to be obtained by processing the data portion of the physical frame. Therefore, in the processing on the physical layer, the control is performed in the BB packet unit, and thus, it is possible to match the timing with the cycle of the boundary of the video (the GOP cycle), in unit narrower than that of a case where the control is performed in the physical frame unit.

Similarly, the data HD-12 which is included in the data portion of the physical frame F-1, corresponds to BB packets HD-12-1 to HD-12-3, and the data A-12 corresponds to BB packets A-12-1 to A-12-3. For this reason, in the processing on the physical layer, the control is performed in the BB packet unit, and thus, even in a case where the cycle of the boundary of the video (GOP cycle) is not coincident with the integer multiple of the cycle of the physical frame, it is possible to match the timing with the cycle of the boundary of the video (the GOP cycle).

In addition, focusing on the BB packet 4K-12-1 of the data 4K-12 in the plurality of BB packets included in the data portion of the physical frame F-1, the BB packet 4K-12-1 includes a BBP header and a payload. In the BBP header, an optional field (Optional Field) and an extension field (Extension Field) are arranged in addition to a header (Header). Then, the video boundary information indicating the boundary (RAP) of the video is included in the BBP header, and thus, it is possible to indicate that a BB packet to which the BBP header is added, includes data corresponding to the boundary (RAP) of the video.

For example, in a case where the data 4K-12 included in the data portion of the physical frame F-1 corresponds to the BB packets 4K-12-1 to 4K-12-3, a case is assumed in which in the data of the stream of "4K" (FIG. 12), the data of the data 4K-1 is stored in the BB packet 4K-12-1, and the data of the data 4K-2 is stored in the BB packet 4K-12-2 and the BB packet 4K-12-3.

In this case, the data of the data 4K-2 stored in the BB packet 4K-12-2, corresponds to the data corresponding to the boundary (RAP) of the video such as the lead of the GOP cycle (the I picture), and thus, the video boundary information is included in the head of the BB packet 4K-12-2, and therefore, it is possible to indicate that the BB packet 4K-12-2 includes the data corresponding to the boundary (RAP) of the video.

With this arrangement, in the receiving device 20, in a case where the broadcast signal is switched according to the quality of the received signal, for example, the BB packet 4K-12-2 including the video boundary information is processed, and thus, the switching timing is coincident with the boundary (RAP) of the video of the data 4K-2 or the data HD-2 processed on the higher layer (a position represented by the arrow P1 in the drawing). As a result thereof, in the receiving device 20, for example, when the broadcast signal of "4K" is switched to the broadcast signal of "HD", or the broadcast signal of "HD" is switched to the broadcast signal of "4K", it is possible to perform the seamless reproduction.

In addition, the video boundary information included in the header of the BB packet is used, and thus, for example, it is possible to perform the seamless reproduction by only operating the circuit of one system (the demodulation unit 212 and the filter 213), and therefore, low power consumption can be realized by minimally operating the circuit. For example, in the demodulation LSI, the circuit size is large, and the power consumption is high, and thus, the effect of low power consumption extremely increases according to a minimal operation of only the circuit of one system.

Furthermore, as described above, in the ATSC 3.0, in a case where the ROUTE is used as the transport protocol, the streaming delivery based on the MPEG-DASH is performed, and in the MPEG-DASH, the stream of the video or the sound is transmitted as the segment file. Then, the segment file includes the RAP in the lead, and thus, in the example of FIG. 12, the boundary (RAP) of the video corresponds to the lead of the segment file, and the switching is performed in the segment file unit, and therefore, it is possible to perform the seamless reproduction.

(Arranging Video Boundary Information in BB Packet Extension Header)

Next, an example of a case where the video boundary information is arranged in a BB packet extension header, will be described with reference to FIG. 14 to FIG. 17.

Figure 14:
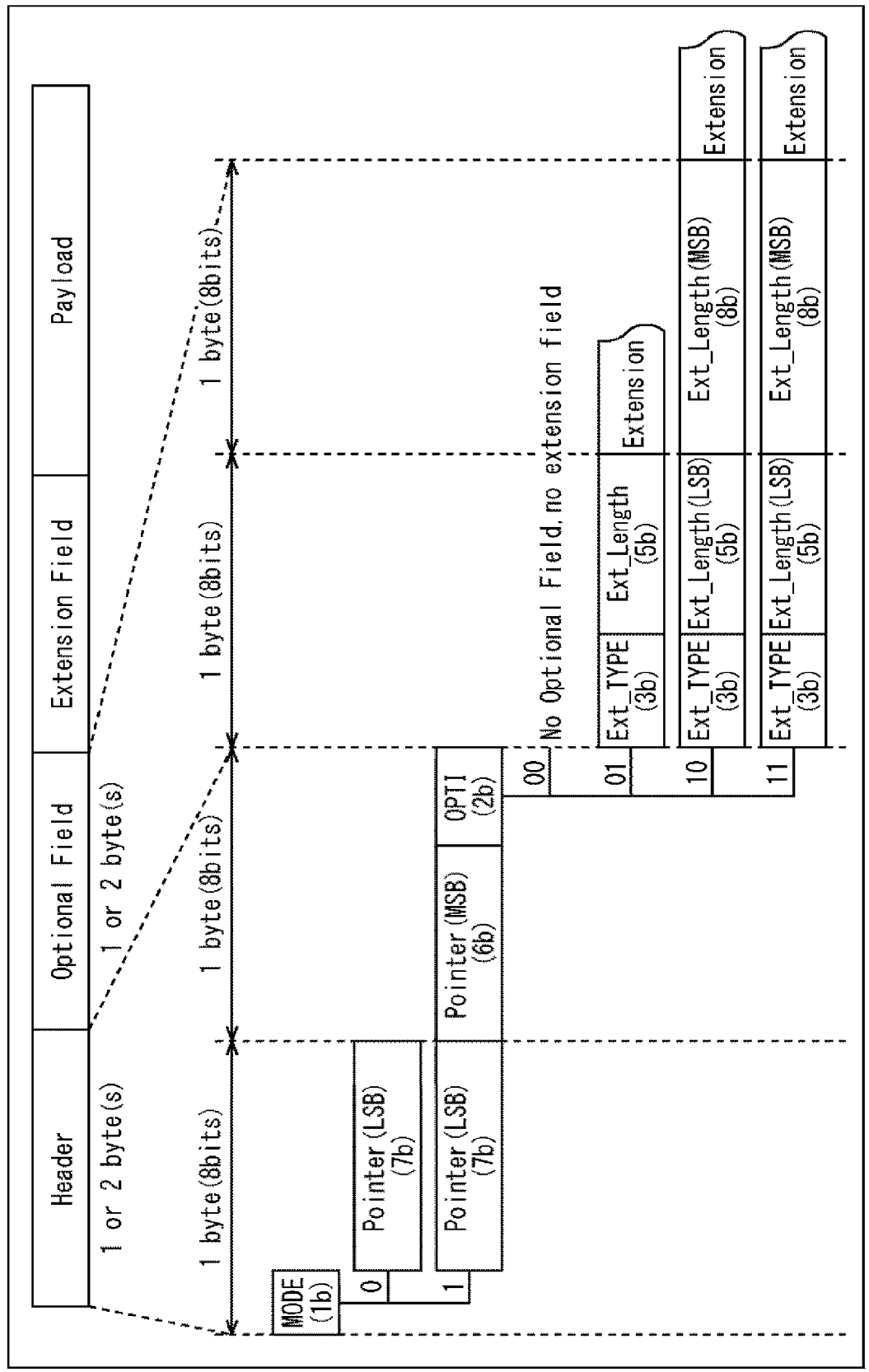
FIG. 14 is a diagram illustrating an extension header of the BB packet.

FIG. 14 illustrates a configuration of the BB packet (Baseband Packet). In FIG. 14, the BB packet includes a BBP header and a payload (Payload). In the BBP header, an optional field (Optional Field) and an extension field (Extension Field) can be arranged, in addition to a header (Header) of 1 or 2 bytes.

That is, in the header (Header), in a case where "0" is set as a mode (MODE) of 1 bit, the pointer information of 7 bits (Pointer(LSB)) is arranged. Furthermore, the pointer information is information for indicating the position of the generic packet to be arranged in the payload of the BB packet. For example, in a case where the data of the generic packet which is lastly arranged in a certain BB packet, is arranged across the next BB packet, the position information of the generic packet to be arranged in the lead of the next BB packet can be set as the pointer information.

In addition, in a case where "1" is set as a mode (MODE), pointer information of 6 bits (Pointer (MSB)) and an optional flag of 2 bits (OPTIONAL: OPTI) are arranged, in addition to pointer information of 7 bits (Pointer (LSB)). The optional flag is information indicating whether or not to extend the header by arranging the optional field (Optional Field) and the extension field (Extension Field).

Figure 15:
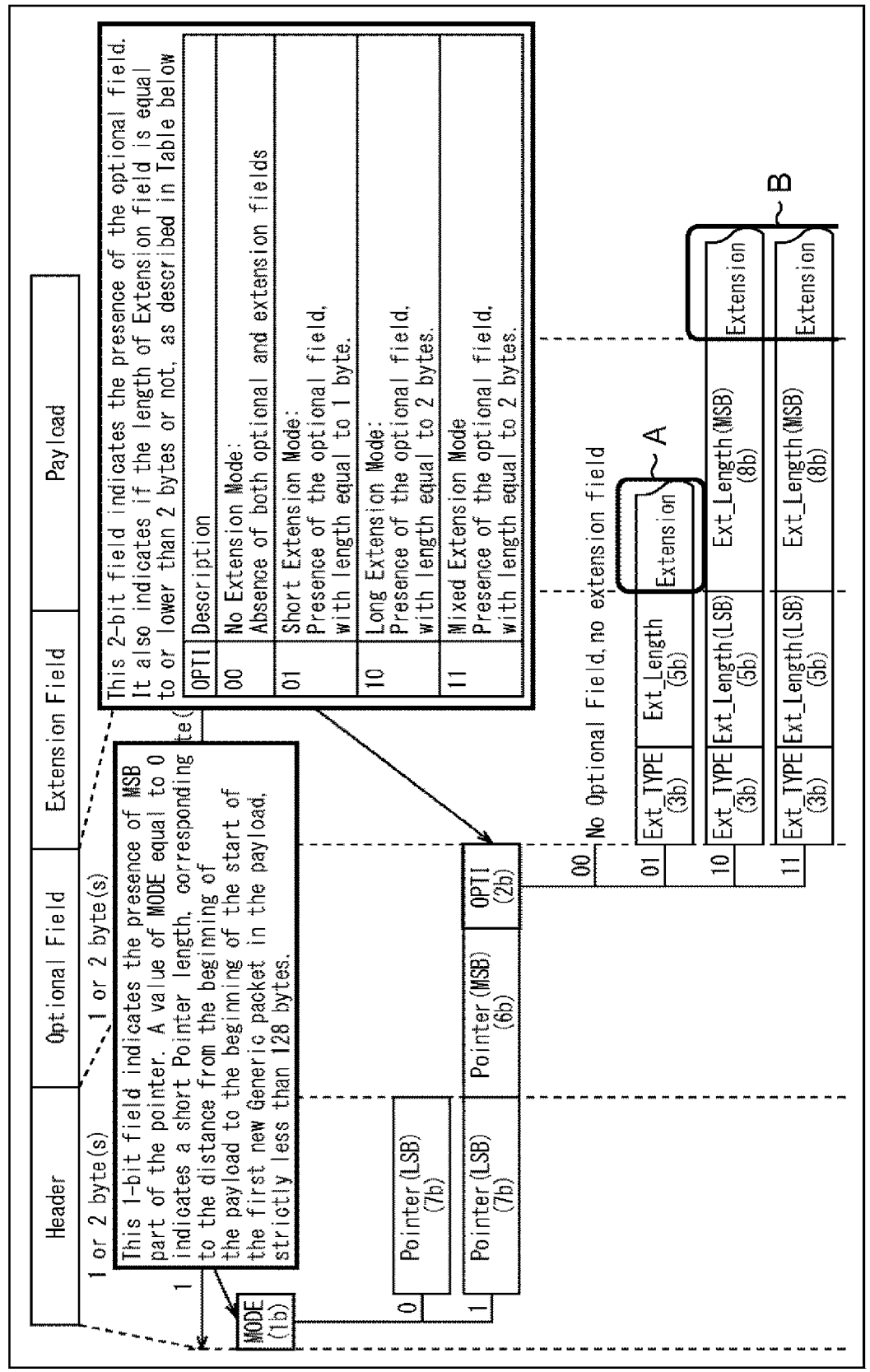
FIG. 15 is a diagram illustrating the extension header of the BB packet.

That is, as illustrated in FIG. 15, in a case where the optional field and the extension field do not extend, in the optional flag, "00" is set. In addition, an optional field of 1 byte and the extension field extend, in the optional flag, "01" is set, and the mode becomes a short extension mode (a frame A in the drawing). On the other hand, an optional field of 2 bytes and the extension field extend, in the optional flag, "10" or "11" is set, and the mode becomes a long extension mode or a mixed extension mode (a frame B in the drawing).

Figure 16:
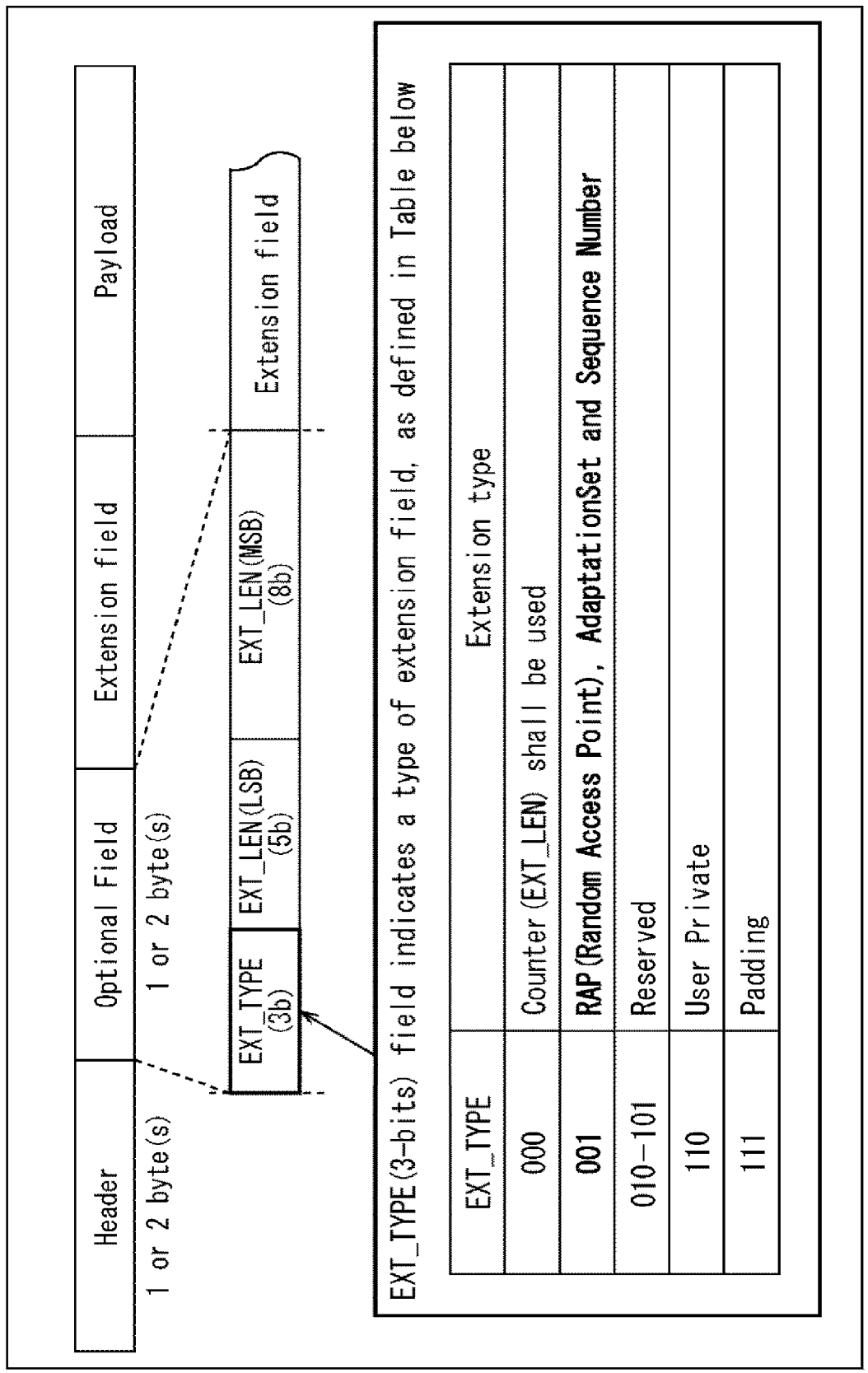
FIG. 16 is a diagram illustrating the extension header of the BB packet.

In the lead of the optional field, extension type information of 3 bits (EXT_TYPE) is set. As illustrated in FIG. 16, information associated with the type of extension field (Extension type) is set as the type information.

That is, in a case where a counter of extension length information (EXT_Length (LSB)) is arranged in the extension field, in the extension type information, "000" is set. In addition, in a case where the video boundary information is arranged in the extension field, in the extension type information, "001" is set. In the video boundary information, RAP, AdaptationSet, and Sequence Number are included.

FIG. 17 illustrates an example of a syntax of the video boundary information, which is included in the header of the BB packet.

The RAP of 1 bit is a flag indicating that the boundary (RAP) of the video is included in the corresponding BB packet. For example, in a case where "0" is set as the RAP, it is indicated that the boundary (RAP) of the video is not included in the corresponding BB packet.

On the other hand, in a case where "1" is set as the RAP, it is indicated that the boundary (RAP) of the video is included in the BB packet. That is, in this case, in the payload of the BB packet, for example, the data of the I picture, which is arranged in the position of the lead in the GOP cycle, is included.

AdaptationSet including the boundary (RAP) of the video is designated as the AdaptationSet of 8 bits. As described above, the AdaptationSet corresponds to an AdaptationSet element which is used for performing the streaming delivery based on the MPEG-DASH, and is described in the MPD metadata. According to the AdaptationSet, it is possible to specify the stream including the boundary (RAP) of the video.

A sequence number of the BB packet is designated as a Sequence Number of 15 bits. In the sequence number, 1 is added for each BB packet, regardless of the presence or absence of the boundary (RAP) of the video. Furthermore, for example, it is possible to identify the corresponding BB packet between different PLPs, by using the sequence number.

Return to the description of FIG. 16, in a case where private user data is arranged in the extension field, in the extension type information, "110" is set. Further, in a case where the extension field is subjected to padding (Padding), in the extension type information, "111" is set. Furthermore, in FIG. 16, extension type information items of "010" to "101" become regions for future extension (Reserved).

As described above, in the control in the BB packet unit in a case of adopting the time division multiplexing (TDM), the video boundary information indicating the boundary (RAP) of the video is included in the header of the BB packet, and thus, in the receiving device 20, the broadcast signal of the target is switched on the basis of the video boundary information, and therefore, the switching timing can be coincident with the boundary (RAP) of the video to be obtained from the signal processed on the higher layer. With this arrangement, in the receiving device 20, it is possible to perform the seamless reproduction at the time of switching the broadcast signal.

(2-2) Control in Hierarchy Unit (FDM)

Next, a control method in a case where the frequency division multiplexing (FDM) is adopted to the multiplexing method of the plurality of broadcast signals, will be described as a control method in a case where the cycle of the boundary of the video (the GOP cycle) is not coincident with the integer multiple of the cycle of the physical frame.

(Relationship between Hierarchy and Video Signal)

Figure 18:
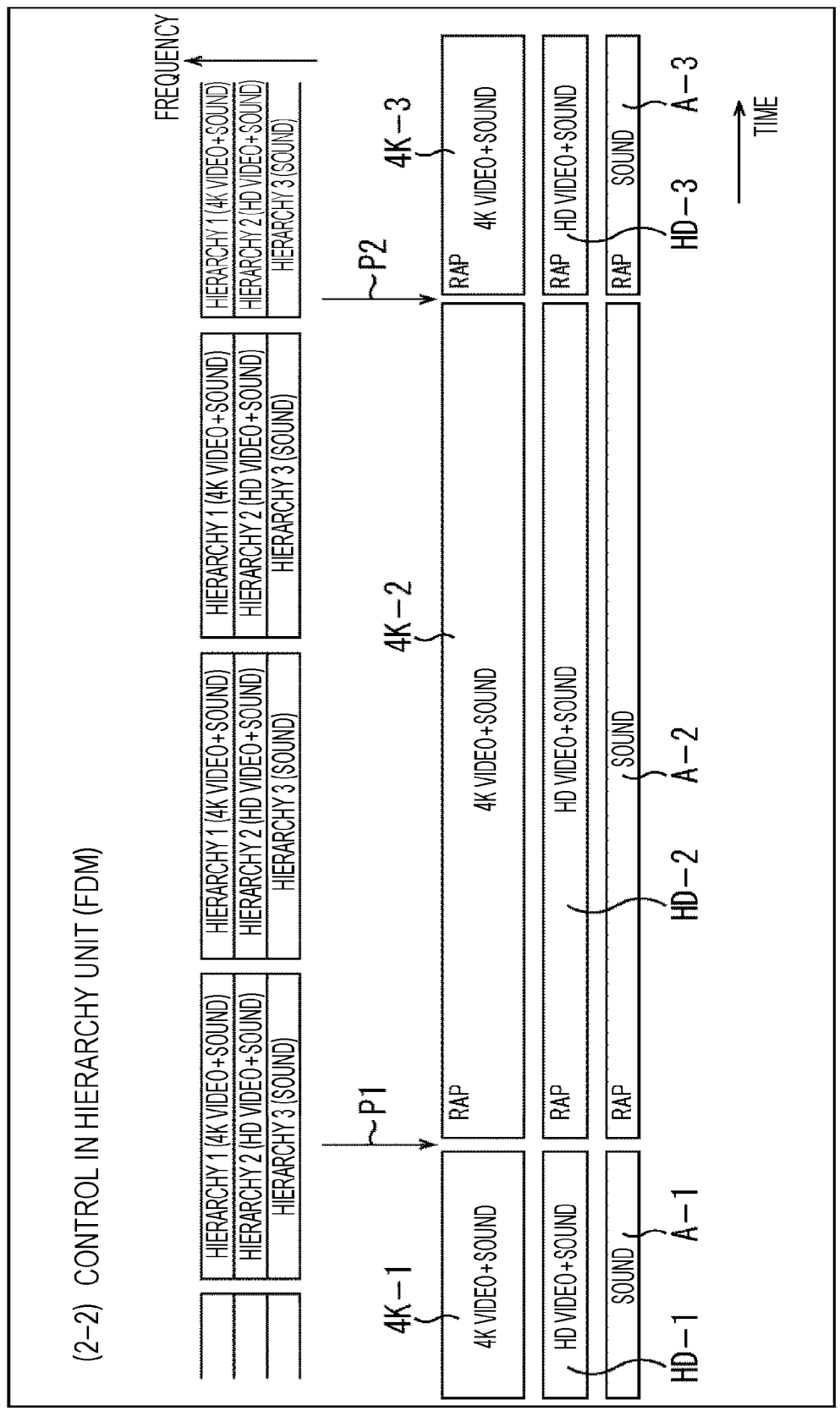
FIG. 18 is a diagram illustrating a relationship between a hierarchy and a video signal in a case of performing control in hierarchy unit.

FIG. 18 is a diagram illustrating a relationship between the hierarchy and the video signal in a case where the switching of the broadcast signal according to the quality of the received signal is performed in the hierarchy unit at the time of performing the hierarchy transmission.

Here, in a case of adopting the frequency division multiplexing (FDM), a predetermined frequency band (for example, 6 MHz) is frequency-divided into a plurality of segments, and the hierarchy transmission using the band for one segment or each of the plurality of segments, can be performed. For example, in the ISDB-T, a frequency band (6 MHz) of one channel is frequency-divided into 13 segments, a broadcast signal of a one-segment broadcast for a mobile receiver is transmitted by using a frequency band of one segment in the center, and a broadcast signal of a broadcast for a fixed receiver is transmitted by using frequency bands of 12 remaining segments.

In the upper portion of FIG. 18, when a horizontal direction is set to time, and a vertical direction is set to a frequency, the configuration of each hierarchy at the time of performing the hierarchy transmission in the transmission system 1 (FIG. 1), is illustrated. In an example of FIG. 18, three hierarchies of a hierarchy 1, a hierarchy 2, and a hierarchy 3 are configured by using the frequency band of one or the plurality of segments to be obtained by the frequency division.

In addition, in the lower portion of FIG. 18, as with FIG. 7 or the like, described above, the configuration of the video signal is illustrated, but the stream of the video signal of "4K" and the sound signal is transmitted in the hierarchy 1. Further, the stream of the video signal of "HD" and the sound signal is transmitted in the hierarchy 2, and the stream of the sound signal of "sound" is transmitted in the hierarchy 3. Therefore, for example, the number of segments is larger in the hierarchy 2 than in the hierarchy 3, and the number of segments is larger in the hierarchy 1 than in the hierarchy 2.

Here, in each of the streams of "4K", "HD", and "sound", a position represented by the arrows P1 and P2 in the drawing, is the boundary (RAP) of the video such as the position of the lead in the GOP cycle (the position of the I picture), and the video boundary information indicating the boundary (RAP) of the video is included in each of the hierarchies, and thus, it is possible to specify the boundary (RAP) of video.

With this arrangement, in the receiving device 20, in a case where the broadcast signal is switched according to the quality of the received signal, the video boundary information to be transmitted in each of the hierarchies, is processed (detected), and thus, the switching timing is coincident with the boundary (RAP) of the GOP structure of the data 4K-2 or the data HD-2 processed on the higher layer (the position represented by the arrow P1 in the drawing). As a result thereof, in the receiving device 20, for example, when the broadcast signal of "4K" to be transmitted in the hierarchy 1, is switched to the broadcast signal of "HD" to be transmitted in the hierarchy 2, or the broadcast signal of "HD" to be transmitted in the hierarchy 2, is switched to the broadcast signal of "4K" to be transmitted in the hierarchy 1, it is possible to perform the seamless reproduction.

(Arranging Video Boundary Information in Additional Information Associated with Broadcast)

Next, an example of a case where the video boundary information is arranged in additional information (AC) associated with a broadcast, will be described with reference to FIG. 19.

Figure 19:
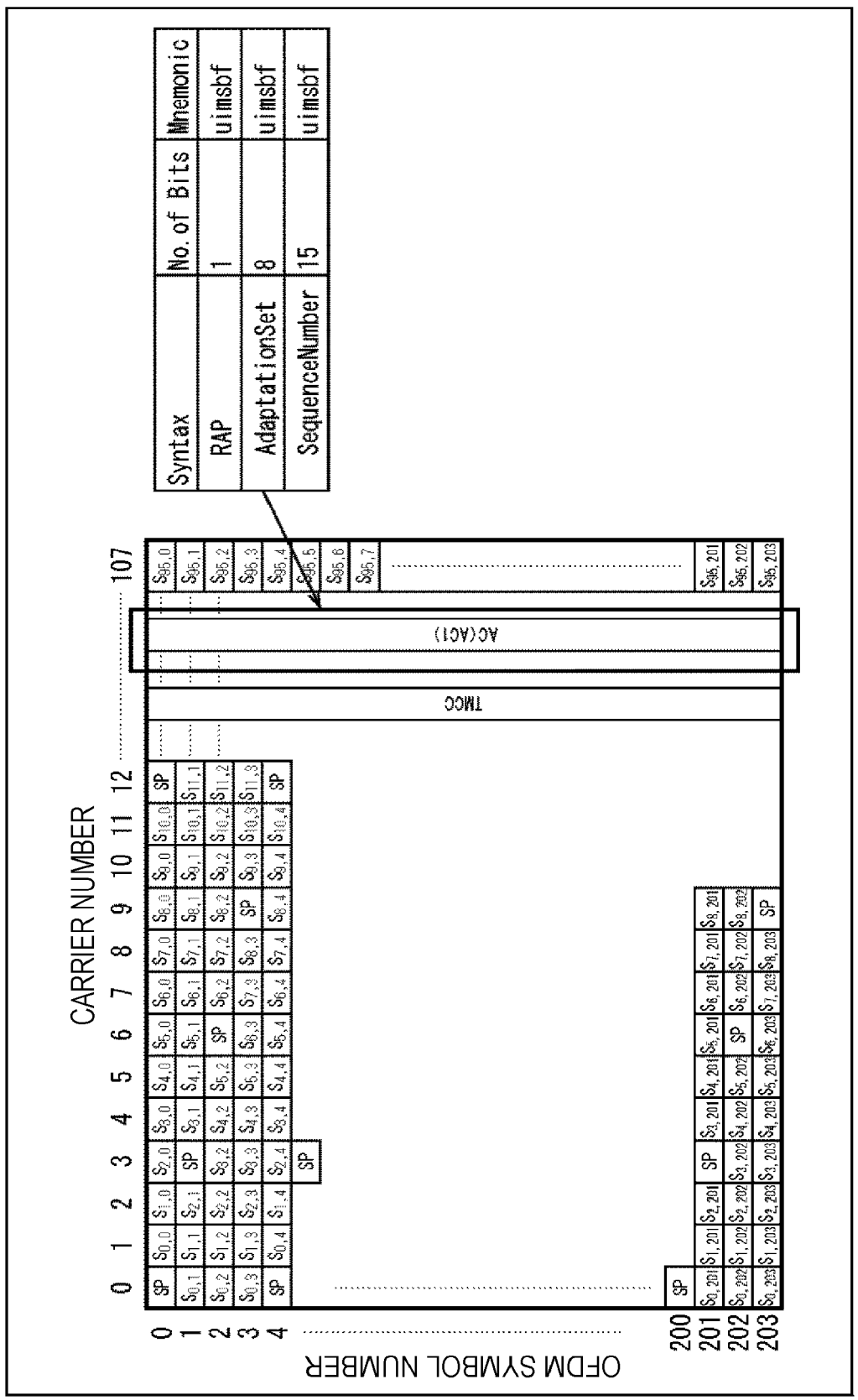
FIG. 19 is a diagram illustrating an example in a case where the video boundary information is arranged in additional information (AC) associated with broadcast.

FIG. 19 illustrates a configuration of an OFDM segment when a horizontal direction is set to a carrier number, and a vertical direction is set to an OFDM symbol number. Here, in orthogonal frequency division multiplexing (OFDM), many subcarriers orthogonal to each other are provided in a transmission band, and digital modulation is performed.

In the OFDM segment of FIG. 19, TMCC and AC are included. In the hierarchy transmission where a plurality of transmission parameters is mixed, transmission multiplexing configuration control (TMCC) is transmission control information for performing demodulation processing, decoding processing, or the like, in the receiving device 20. In addition, an auxiliary channel (AC) is additional information associated with a broadcast. The numbers of AC1s that exist in all of the segments are the same. For example, in the additional information (AC (AC1)), the video boundary information can be included.

FIG. 19 illustrates an example of the syntax of the video boundary information, which is included in the additional information (AC) associated with the broadcast.

The RAP of 1 bit is a flag indicating that the boundary (RAP) of the video is included in the corresponding segment. For example, in a case where "1" is set as the RAP, it is indicated that the boundary (RAP) of the video is included in the corresponding segment.

AdaptationSet including the boundary (RAP) of the video is designated as the AdaptationSet of 8 bits. According to the AdaptationSet, it is possible to specify the stream including the boundary (RAP) of the video. A sequence number is designated as the Sequence Number of 15 bits.

As described above, in the control in the hierarchy unit (a segment unit) in a case of adopting the frequency division multiplexing (FDM), the video boundary information indicating the boundary (RAP) of the video is included in the additional information (AC) which can be designated in the segment unit. In the receiving device 20, the broadcast signal of the target is switched on the basis of the video boundary information included in the additional information (AC), and thus, the switching timing can be coincident with the boundary (RAP) of the video to be obtained from the signal processed on the higher layer. With this arrangement, in the receiving device 20, it is possible to perform the seamless reproduction at the time of switching the broadcast signal.

Furthermore, the video boundary information is not limited to the additional information (AC) associated with the broadcast, and for example, may include the other control information such as the transmission control information (TMCC).

Figure 20:
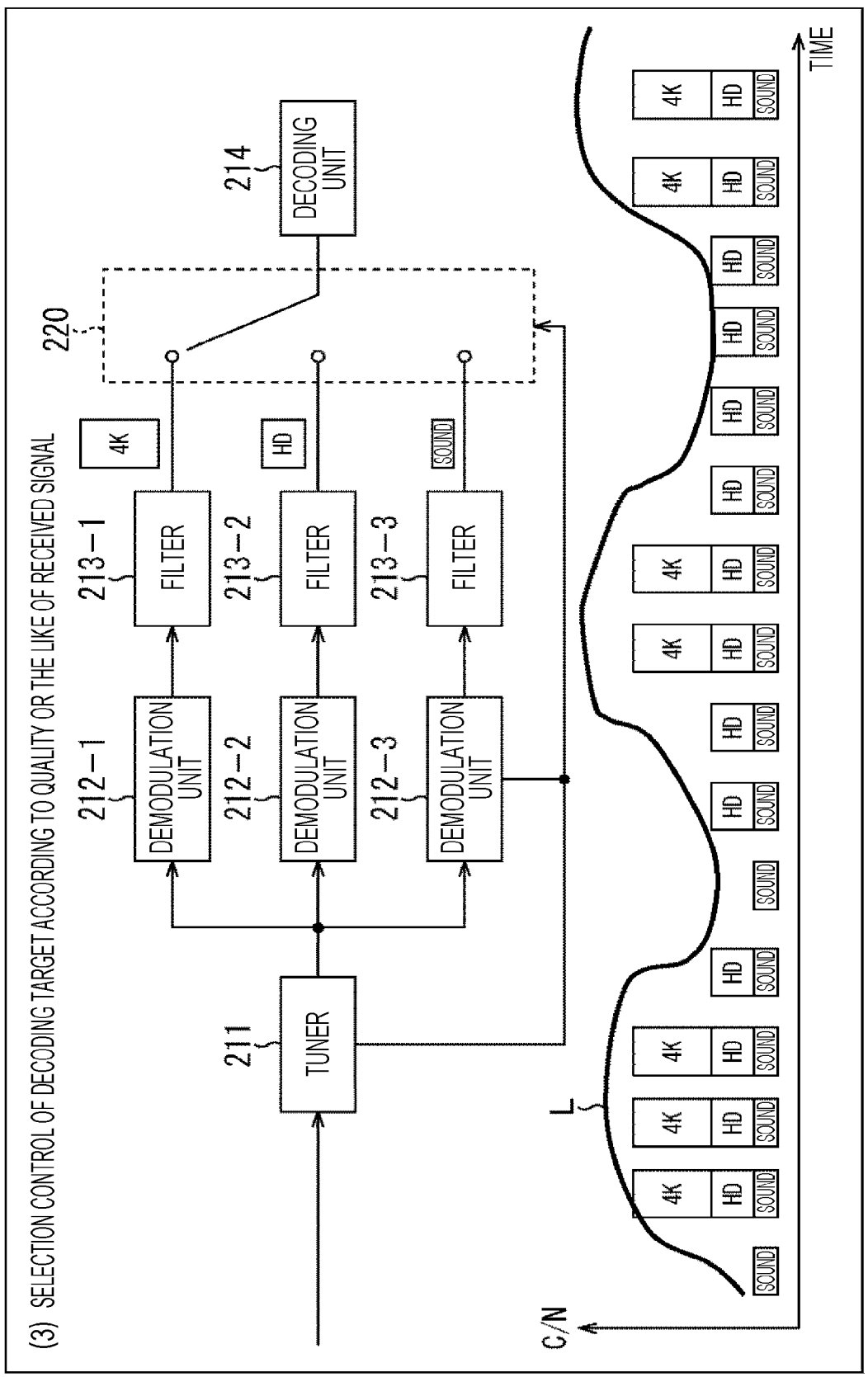
FIG. 20 is a diagram illustrating selection control of a decoding target according to the quality or the like of a received signal.

(3) Selection Control of Decoding Target according to Quality or the Like of Received Signal Next, a case of not using the video boundary information will be described with reference to FIG. 20. FIG. 20 is a diagram for illustrating selection control of the decoding target according to the quality or the like of the received signal.

In FIG. 20, the receiving device 20 includes the tuner 211, demodulation units 212-1 to 212-3, filters 213-1 to 213-3, a selection unit 220, and the decoding unit 214. Here, in a configuration example of the receiving device 20 of FIG. 20, the description of the control unit 210 and the output unit 215 is omitted, and the selection unit 220 is a part of the function of the control unit 210.

The tuner 211 processes a broadcast signal of a predetermined frequency band, which is received through the antenna 221, according to the control from the control unit 210, and supplies a received signal to be obtained as a result thereof to the demodulation units 212-1 to 212-3.

Here, for example, in a case where the broadcast signals of "4K", "HD", and "sound" are received as the broadcast signal to be transmitted from the transmitting device 10, a received signal of "4K" is supplied to the demodulation unit 212-1, a received signal of "HD" is supplied to the demodulation unit 212-2, and a received signal of "sound" is supplied to the demodulation unit 212-3.

The demodulation unit 212-1 performs the demodulation processing with respect to the received signal to be supplied from the tuner 211, according to the control from the control unit 210, and supplies the stream of "4K" to be obtained as a result thereof, to the filter 213-1. The filter 213-1 processes the stream of "4K" from the demodulation unit 212-1, according to the control from the control unit 210. With this arrangement, the video signal of "4K" or the sound signal are obtained.

The demodulation unit 212-2 performs the demodulation processing with respect to the received signal to be supplied from the tuner 211, according to the control from the control unit 210, and supplies the stream of "HD" to be obtained as a result thereof, to the filter 213-2. The filter 213-2 processes the stream of "HD" from the demodulation unit 212-2, according to the control from the control unit 210. With this arrangement, the video signal of "HD" or the sound signal are obtained.

The demodulation unit 212-3 performs the demodulation processing with respect to the received signal to be supplied from the tuner 211, according to the control from the control unit 210, and supplies the stream of "sound" to be obtained as a result thereof, to the filter 213-3. The filter 213-3 processes the stream of "sound" from the demodulation unit 212-3, according to the control from the control unit 210. With this arrangement, the sound signal of "sound" is obtained.

At this time, a processing result to be obtained by the processing of the tuner 211, and a processing result to be obtained by the processing of the demodulation units 212-1 to 212-3, are supplied to the control unit 210. The control unit 210 selects a signal of the decoding target, on the basis of at least one of processing results from the tuner 211 and the demodulation unit 212.

That is, in the control unit 210, for example, information indicating the quality of the received signal, such as the C/N ratio, the error rate of the signal to be obtained in the demodulation processing, or the like is obtained, as the processing result, and thus, it is possible to select the signal of the decoding target, on the basis of such information. The control unit 210 controls the selection unit 220, on the basis of a selection result of the signal of the decoding target, and thus, supplies a signal of a selection target to the decoding unit 214.

In a case where a signal of "4K" is selected as the signal of the decoding target, the control unit 210 supplies the video signal of "4K" or the sound signal from the filter 213-1, to the decoding unit 214. The decoding unit 214 decodes the video signal of "4K" or the sound signal to be supplied from the filter 213-1. With this arrangement, in the receiving device 20, the video of 4K and the sound are reproduced.

In a case where a signal of "HD" is selected as the signal of the decoding target, the control unit 210 supplies the video signal of "HD" or the sound signal from the filter 213-2, to the decoding unit 214. The decoding unit 214 decodes the video signal of "HD" or the sound signal to be supplied from the filter 213-2. With this arrangement, in the receiving device 20, the video of the HD and the sound are reproduced.

In a case where a signal of "sound" is selected as the signal of the decoding target, the control unit 210 supplies the sound signal of "sound" from the filter 213-3, to the decoding unit 214. The decoding unit 214 decodes the sound signal of "sound" to be supplied from the filter 213-3. With this arrangement, in the receiving device 20, only the sound is reproduced.

Here, in a case where the signal of the decoding target is switched, the control unit 210 switches the stream described in the AdaptationSet element of the MPD metadata, on the basis of information associated with a segment file to be obtained by the processing of the filters 213-1 to 213-3 (for example, a template or a time stamp of ISOBMFF), and thus, it is possible to switch the stream without causing the disturbance to occur in the video or the sound.

As a result thereof, in the receiving device 20, for example, as illustrated in the lower portion of FIG. 20, when the broadcast signal of "4K" is switched to the broadcast signal of "HD", or the broadcast signal of "HD" is switched to the broadcast signal of "4K", according to the quality of the received signal, it is possible to perform the seamless reproduction. Furthermore, the control method of switching the stream by using the information associated with the segment file and the MPD metadata, described herein, is an example, and other control methods may be used insofar as the seamless reproduction can be performed.

Furthermore, in an example of FIG. 20, a configuration of a case where the demodulation unit 212 and the filter 213 are provided in a plurality of systems (three systems), is exemplified, but the demodulation unit 212 and the filter 213 are operated in time division, and thus, it is possible to perform the equivalent processing by the demodulation unit 212 and the filter 213 in one system or a less system.

<4. Flow of Seamless Reproduction Processing>

Figure 21:
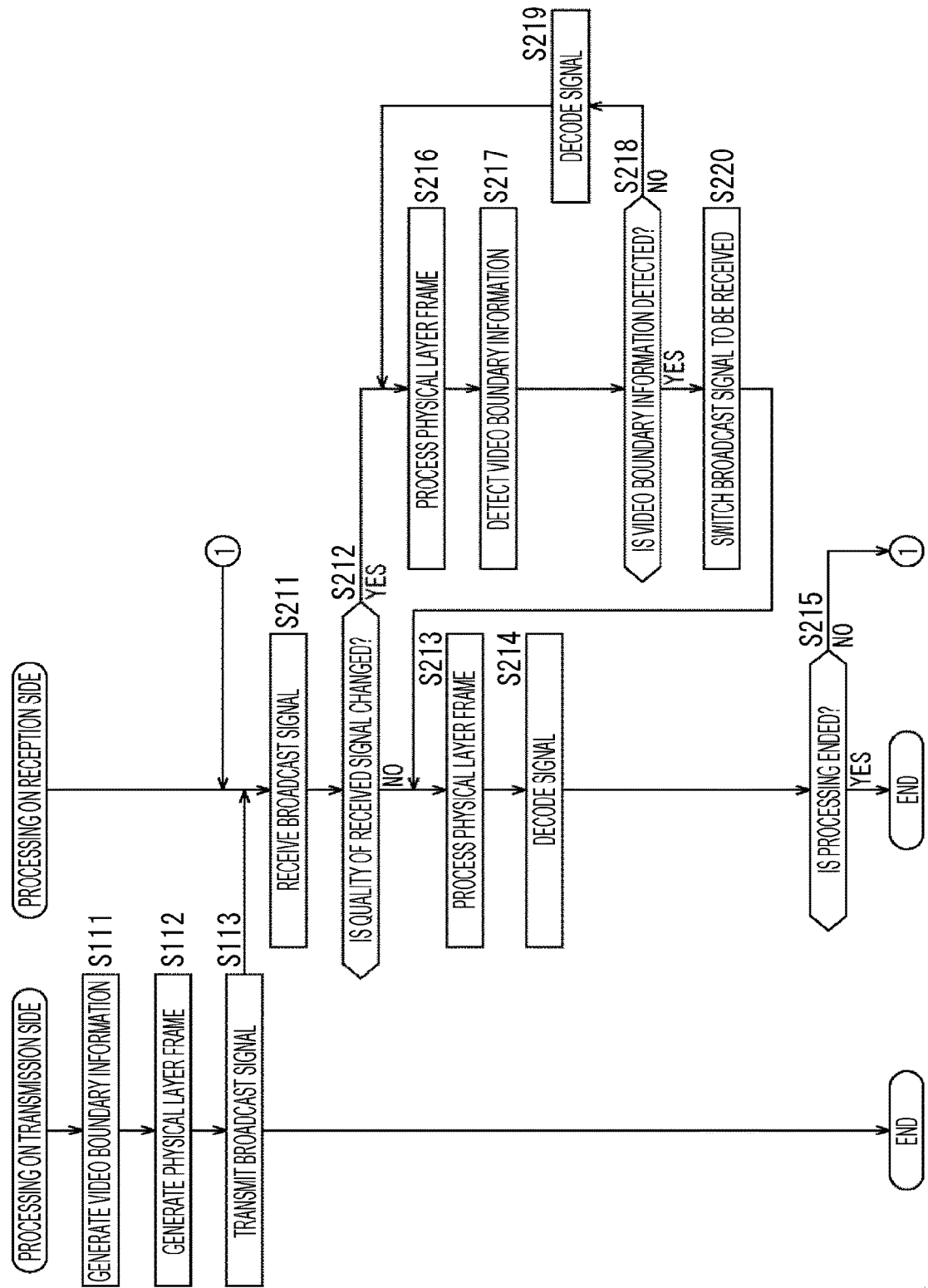
FIG. 21 is a flowchart illustrating a flow of first seamless reproduction processing.

Next, a flow of seamless reproduction processing to be realized in the transmission system of FIG. 1 will be described with reference to flowcharts of FIG. 21 and FIG. 22.

(First Seamless Reproduction Processing)

First, a flow of first seamless reproduction processing will be described with reference to the flowchart of FIG. 21.

The first seamless reproduction processing corresponds to a case of using the video boundary information. Furthermore, in FIG. 21, processing of Steps S111 to S113, is processing on a transmission side, which is executed by the transmitting device 10 of FIG. 1. In addition, processing of Steps S211 to S220 is processing on a reception side, which is executed by the receiving device 20 of FIG. 1.

In Step S111, the signaling processing unit 112 generates the video boundary information indicating the boundary (RAP) of the video, according to a stream of a processing target.

In Step S112, the modulation unit 114 processes a multiplexing stream to be generated by the processing unit 113, and generates a physical frame. Here, in the multiplexing stream, for example, the stream of the same or corresponding contents, such as the streams of "4K", "HD", and "sound", is included.

In addition, the modulation unit 114 performs processing such that the video boundary information indicating the boundary (RAP) of the video of each of the contents is included, in any unit of the physical frame unit, the BB packet unit, or the hierarchy unit, according to the stream of the processing target.

That is, in a case where the control in the physical frame unit, is performed, the video boundary information is included in the L1 signaling included in the preamble of the physical frame. In addition, in a case where the control in the BB packet unit, is performed, the video boundary information is included in the header of the BB packet. Further, in a case where the control in the hierarchy unit (the segment unit), is performed, the video boundary information is included in the additional information (AC) associated with the broadcast.

The physical frame generated by the processing of Step S112, is transmitted through the transmission path 30, as the broadcast signal (S113). Here, for convenience of description, for example, the stream of the same or corresponding contents, such as the streams of "4K", "HD", and "sound", is expressed as being transmitted for each of the streams, as the plurality of broadcast signals.

In Step S211, the tuner 211 receives the broadcast signal transmitted from the transmitting device 10, through the antenna 221, according to the control from the control unit 210.

In Step S212, the control unit 210 determines whether or not the quality of the broadcast signal (the received signal) received by the processing of Step S211, is changed. Here, for example, the C/N ratio to be obtained from the received signal is compared with a predetermined threshold value, and thus, it is possible to determine the quality of the received signal.

In Step S212, in a case where it is determined that the quality of the received signal is not changed, the processing proceeds to Step S213. In Step S213, the demodulation unit 212 processes the physical frame to be obtained from the broadcast signal received by the processing of Step S211. The data to be obtained from the physical frame is processed by the filter 213, and the video signal or the sound signal are obtained.

In Step S214, the decoding unit 214 decodes the video signal or the sound signal to be obtained in the processing of Step S213. The data of the video or the sound decoded by the decoding unit 214, is output by the output unit 215, and for example, the video of HD and the sound are reproduced.

In Step S215, it is determined whether or not the processing is ended. In Step S215, in a case where it is determined that the processing is ended, the processing proceeds to Step S211. Then, the processing of Steps S211 to S215 is repeated until it is determined that the quality of the received signal is changed in determination processing of Step S212, and for example, the video of HD and the sound are continuously reproduced.

After that, in Step S212, in a case where it is determined that the quality of the received signal is changed, the processing proceeds to Step S216. In Step S216, the demodulation unit 212 processes the physical frame to be obtained from the broadcast signal.

In Step S217, the demodulation unit 212 detects the video boundary information, on the basis of the signal processed on the physical layer which is obtained in the processing of Step S216, according to the control from the control unit 210.

That is, here, in a case where the control in the physical frame unit, is performed, the video boundary information is detected from the L1 signaling included in the preamble of the physical frame. In addition, in a case where the control in the BB packet unit, is performed, the video boundary information is detected from the header of the BB packet. Further, in a case where the control in the hierarchy unit (the segment unit), is performed, the video boundary information is detected from the additional information (AC) associated with the broadcast.

In Step S218, the control unit 210 determines whether or not the video boundary information is detected from the signal processed on the physical layer, on the basis of a detection result to be obtained in the processing of Step S217.

In Step S218, in a case where it is determined that the video boundary information is not detected, the processing proceeds to Step S219. In Step S219, the decoding unit 214 decodes the video signal or the sound signal to be obtained in the processing of Step S216. The data of the video or the sound decoded by the decoding unit 214, is output by the output unit 215, and for example, the video of HD and the sound are continuously reproduced.

In a case where the processing of Step S219 is ended, the processing returns to Step S216. Then, the processing of Steps S216 to S219 is repeated until it is determined that the video boundary information is detected in determination processing of Step S218, and for example, the video of HD and the sound are continuously reproduced.

Then, in Step S218, in a case where it is determined that the video boundary information is detected, the processing proceeds to Step S220. In Step S220, the control unit 210 controls the tuner 211 or the demodulation unit 212, and switches the broadcast signal received from the transmitting device 10. Here, for example, the broadcast signal of "HD" is switched to the broadcast signal of "4K", according to a change in the quality of the received signal.

In the processing of Step S220, in a case where the broadcast signal is switched, the processing proceeds to Step S213. In Steps S213 and S214, the physical frame to be obtained from the broadcast signal after being switched, is processed, and the video signal or the sound signal is decoded, and thus, for example, the video of 4K and the sound are reproduced, and the video of the same contents is switched from a video of HD resolution to a video of 4K resolution.

Here, according to the determination processing of Step S218, the switching timing of the signal processed on the physical layer in the processing of Step S220, is coincident with the boundary (RAP) of the video processed in Step S214. For this reason, for example, when the C/N ratio increases, and the quality of the received signal becomes more excellent, the reproduction is smoothly performed without causing the disturbance to occur in the video or the sound, at the time of switching the video of HD resolution to the video of 4K resolution.

Furthermore, the processing described above is repeated until it is determined that the processing is ended in determination processing of Step S215. Then, in Step S215, in a case where it is determined that the processing is ended, the first seamless reproduction processing of FIG. 21 is ended.

As described above, the flow of the first seamless reproduction processing has been described.

(Second Seamless Reproduction Processing)

Next, a flow of second seamless reproduction processing will be described with reference to the flowchart of FIG. 22.

The second seamless reproduction processing corresponds to a case of not using the video boundary information. Furthermore, in FIG. 22, processing of Steps S131 and S132 is processing on the transmission side, which is executed by the transmitting device 10 of FIG. 1. In addition, processing of Steps S231 to S235 is processing on the reception side, which is executed by the receiving device 20 of FIG. 1.

In Step S131, the multiplexing stream to be generated by the processing unit 113 is processed, and the physical frame is generated. Here, in the multiplexing stream, for example, the stream of the same or corresponding contents, such as the streams of "4K", "HD", and "sound", is included.

The physical frame generated by the processing of Step S131, is transmitted through the transmission path 30, as the broadcast signal (S132).

In Step S231, the tuner 211 receives the broadcast signal transmitted from the transmitting device 10 through the antenna 221, according to the control from the control unit 210.

In Step S232, the demodulation units 212-1 to 212-3 process the physical frame to be obtained from the broadcast signal received by the processing of Step S231. The signal to be obtained from the physical frame is processed by the filters 213-1 to 213-3, and the video signal or the sound signal is obtained.

Here, for example, the signal of "4K" is processed by the demodulation unit 212-1 and the filter 213-1. In addition, for example, the signal of "HD" is processed by the demodulation unit 212-2 and the filter 213-2, and the signal of "sound" is processed by the demodulation unit 212-3 and the filter 213-3.

In Step S233, the control unit 210, for example, the signal of the decoding target is selected in the signals to be output from the filters 213-1 to 213-3, on the basis of the information indicating the quality of the received signal, such as the C/N ratio, the information of the error rate or the like of the signal obtained in the demodulation processing.

In Step S234, the decoding unit 214 decodes any signal of the signals output from the filters 213-1 to 213-3, on the basis of a selection result of the decoding target obtained in the processing of Step S233.

Here, for example, in a case where the signal of "4K" is selected as the signal of the decoding target, the video signal of "4K" or the sound signal from the filter 213-1, is decoded. With this arrangement, in the receiving device 20, the video of 4K and the sound are reproduced.

In addition, for example, in a case where the signal of "HD" is selected as the signal of the decoding target, the video signal of "HD" or the sound signal from the filter 213-2, is decoded. With this arrangement, in the receiving device 20, the video of HD and the sound are reproduced. In addition, for example, in a case where the signal of "sound" is selected as the signal of the decoding target, the sound signal of "sound" from the filter 213-3, is decoded. With this arrangement, in the receiving device 20, only the sound is reproduced.

In Step S235, it is determined whether or not the processing is ended. In Step S235, in a case where it is determined that the processing is not ended, the processing returns to Step S231, and the processing of Steps S231 to S235 is repeated.

Steps S231 to S235 are repeated, and thus, the signal of the decoding target, which is selected in the processing of Step S233, is decoded, but in a case where the signal of the decoding target is switched, the control unit 210 switches the stream described in the AdaptationSet element of the MPD metadata, on the basis of the information associated with the segment file to be obtained by the processing of the filters 213-1 to 213-3 (for example, a template or a time stamp of ISOBMFF), and therefore, it is possible to switch the stream without causing the disturbance to occur in the video or the sound.

For example, in the receiving device 20, when the broadcast signal of "4K" is switched to the broadcast signal of "HD", or the broadcast signal of "HD" is switched to the broadcast signal of "4K", according to the quality or the like of the received signal, it is possible to perform the seamless reproduction.

Figure 22:
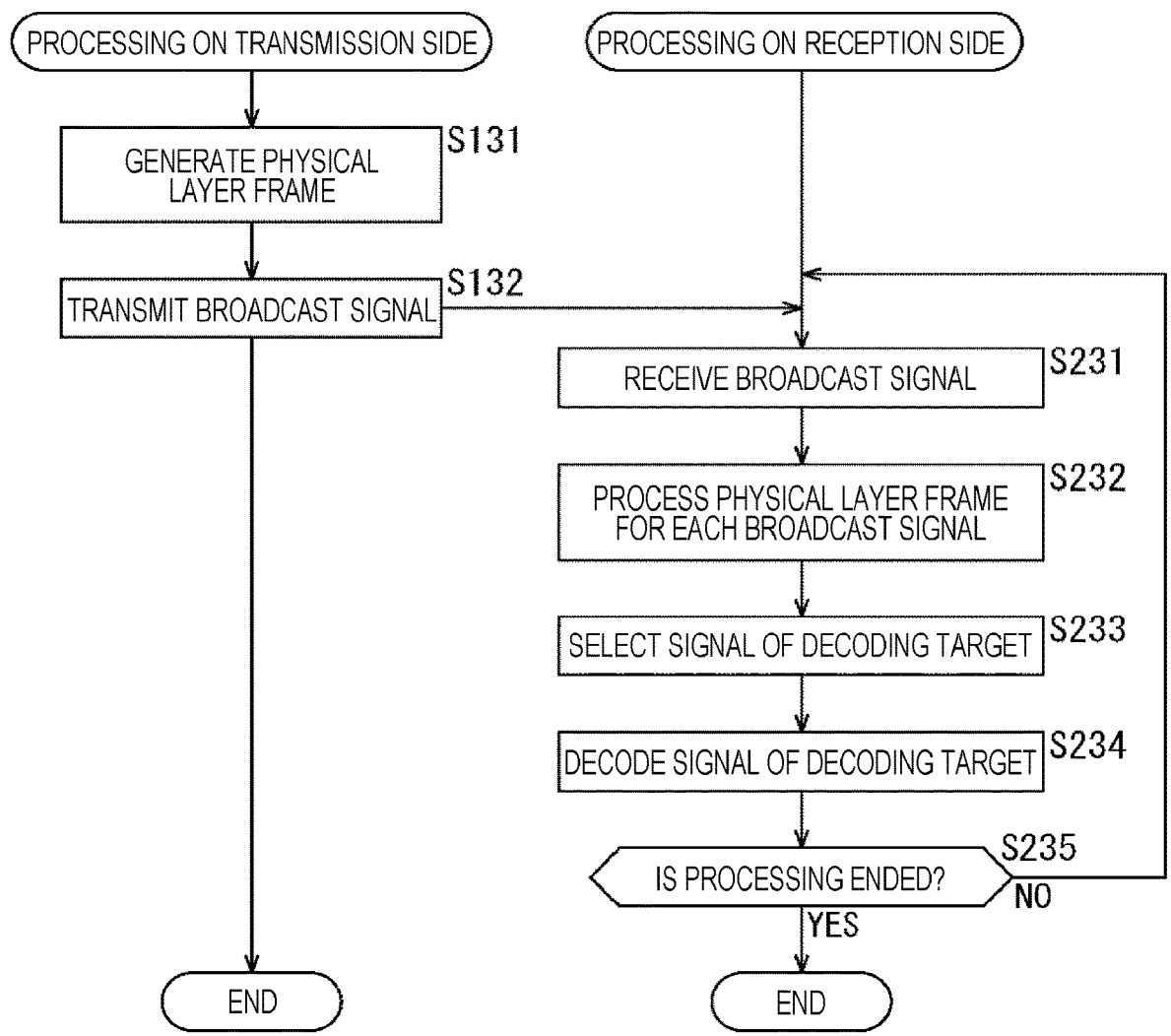
FIG. 22 is a flowchart illustrating a flow of second seamless reproduction processing.

Furthermore, in determination processing of Step S235, in a case where it is determined that the processing is ended, the second seamless reproduction processing of FIG. 22 is ended.

As described above, the flow of the second seamless reproduction processing has been described.

<5. Modification Example>

In the above description, the ISDB (in particular, the ISDB-T) which is a system adopted in Japan and other countries, the ATSC (in particular, the ATSC 3.0) which is a system adopted in the U.S.A. and other countries, have been mainly described as the standard of the digital television broadcast, and digital video broadcasting (DVB) which is a system adopted in each country of Europe, or the like, may be applied, for example. In addition, in the above description, the ATSC 3.0 in which the IP transmission system is adopted, has been described as an example, and for example, other systems such as an MPEG2-transport stream (TS) system, may be applied without being limited to the IP transmission system.

In addition, a standard of a satellite broadcast using a broadcasting satellite (BS), a communications satellite (CS), or the like, a cable broadcast such as a cable television (CATV), or the like, can be applied as the standard of the digital television broadcast, in addition to a terrestrial broadcast.

In addition, the name such as the signaling or the packet described above, is an example, and there is a case where other names are used. However, a difference between the names is a formal difference, and substantial contents of the signaling, the packet, or the like of the target, are not different. For example, there is a case where the BB packet (Baseband Packet) is referred to as the BB stream (Baseband Stream) or the like. In addition, for example, there is a case where the generic packet is referred to as an ATSC link-layer protocol (ALP) packet or the like. In addition, there is a case where the frame and the packet are used as the same meaning.

In the above description, the broadcast program has been described as the contents, but the contents are not limited thereto, and for example, all contents such as an electronic book or a game, and an advertisement, can be included, in addition to a moving image or a music. In addition, the contents may be contents to be delivered through communication, without being limited to the broadcast program. In addition, a part of components configuring the contents, may be delivered through communication.

In addition, the present technology can also be applied to a predetermined standard (a standard other than the standard of the digital television broadcast) or the like, which is defined by assuming that a transmission path other than a broadcast network, that is, for example, a communication line (a communication network) such as the internet or a telephone network, is used as the transmission path. In this case, the communication line such as the internet or the telephone network, is used as the transmission path 30 of the transmission system 1 (FIG. 1), and the transmitting device 10 can be a server provided on the internet. Then, the communication server and the receiving device 20 perform bidirectional communication through the transmission path 30 (the communication line).

<6. Configuration of Computer>

Figure 23:
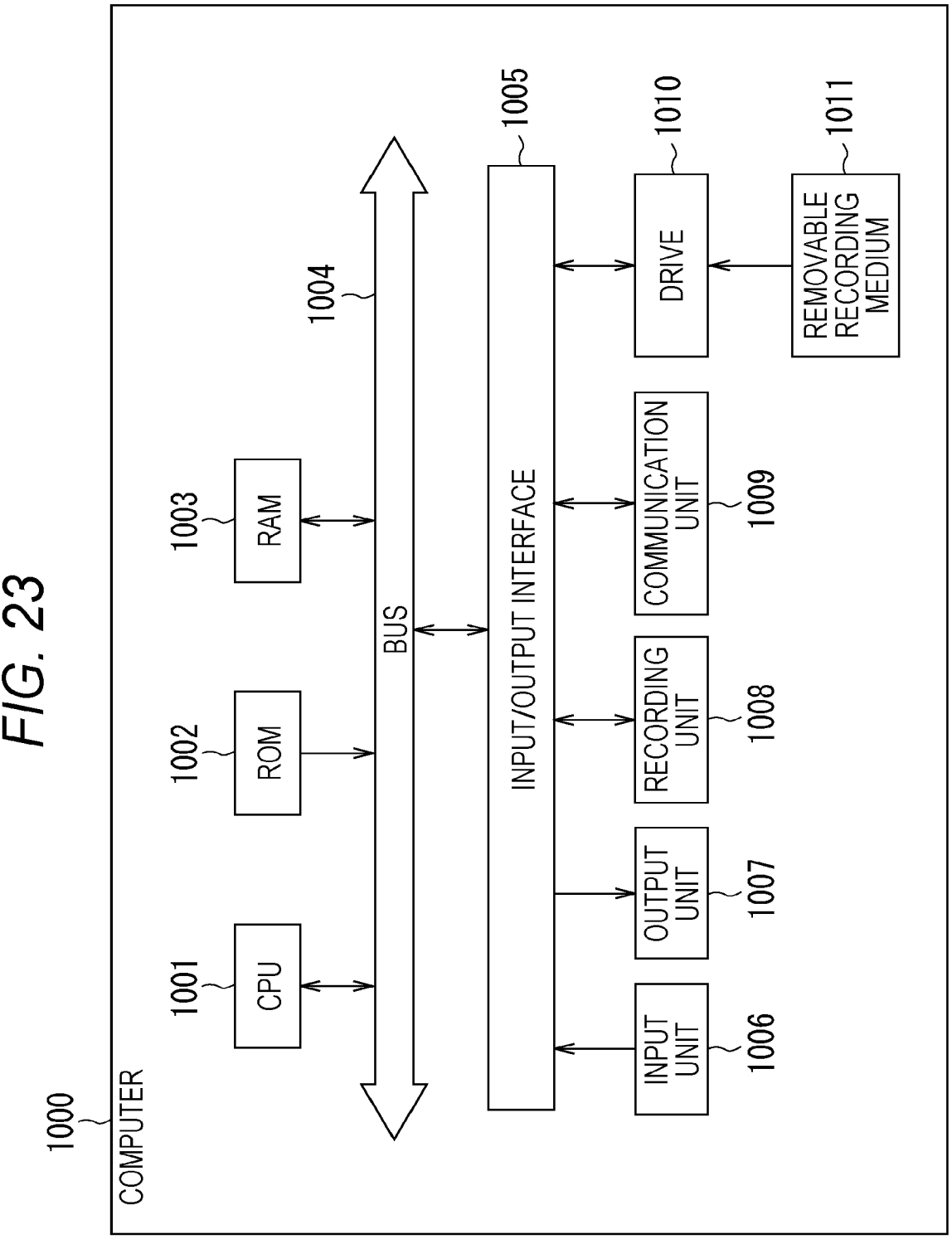
FIG. 23 is a diagram illustrating a configuration example of a computer.

A set of processing described above, can be executed by hardware, or can be executed by software. In a case where the set of processing are executed by the software, a program configuring the software, is installed in a computer. FIG. 23 is a diagram illustrating a hardware configuration example of a computer that executes the set of processing described above by a program.

Ina computer 1000, a central processing unit (CPU) 1001, a read only memory (ROM) 1002, and a random access memory (RAM) 1003 are connected to each other, through a bus 1004. Further, an input/output interface 1005 is connected to the bus 1004. An input unit 1006, an output unit 1007, a recording unit 1008, a communication unit 1009, and a drive 1010 are connected to the input/output interface 1005.

The input unit 1006 includes a keyboard, a mouse, a microphone, and the like. The output unit 1007 includes a display, a speaker, and the like. The recording unit 1008 includes a hard disk, a non-volatile memory, and the like. The communication unit 1009 includes a network interface and the like. The drive 1010 drives a removable recording medium 1011 such as a magnetic disk, an optical disk, a magnetooptical disk, or a semiconductor memory.

In the computer 1000 configured as described above, the CPU 1001 executes a program recorded in the ROM 1002 or the recording unit 1008, by loading the program in the RAM 1003, through the input/output interface 1005 and the bus 1004, and thus, the set of processing described above are performed.

The program to be executed by the computer 1000 (the CPU 1001), for example, can be provided by being recorded in the removable recording medium 1011 as a package media or the like. In addition, the program can be provided through a wired or wireless transmission medium such as a local area network, the internet, and a digital satellite broadcast.

In the computer 1000, the program can be installed in the recording unit 1008 through the input/output interface 1005, by mounting the removable recording medium 1011 on the drive 1010. In addition, the program can be installed in the recording unit 1008 by being received in the communication unit 1009 through the wired or wireless transmission medium. In addition, the program can be installed in advance in the ROM 1002 or the recording unit 1008.

Here, herein, it is not necessary that the processing performed by the computer according to the program, be performed in chronological order, according to the order described as the flowchart. That is, the processing performed by the computer according to the program, also includes processing to be executed in parallel or individually (for example, parallel processing or processing according to an object). In addition, the program may be processed by one computer (one processor), or may be processed by being distributed in a plurality of computers.

Furthermore, the embodiment of the present technology is not limited to the embodiment described above, and various modifications can be performed within a range not departing from the gist of the present technology.

In addition, the present technology can be configured as follows.

(1)

A receiving device, including:

a receiving unit configured to receive a plurality of broadcast signals; and a control unit configured to select a broadcast signal of a target from the plurality of broadcast signals, on the basis of a result of processing with respect to the broadcast signal.

(2)

The receiving device according to (1), in which each of the plurality of broadcast signals transmits the same or corresponding contents, and the control unit switches the broadcast signal of the target, on the basis of video boundary information which is information indicating a boundary of a video of the contents.

(3)

The receiving device according to (2), in which the plurality of broadcast signals is transmitted in time division multiplexing (TDM), and the video boundary information is included in a header of a packet of a baseband after being demodulated.

(4)

The receiving device according to (2), in which the plurality of broadcast signals is transmitted in frequency division multiplexing (FDM), and the video boundary information is included in additional information of a segment unit.

(5)

The receiving device according to (2), in which the video boundary information is included in a preamble of a physical frame.

(6)

The receiving device according to any one of (2) to (5), in which the video boundary information includes information for specifying a stream including the boundary of the video.

(7)

The receiving device according to (1), further including:

a plurality of demodulation units configured to demodulate the plurality of broadcast signals, in which the control unit switches the broadcast signal of the target, on the basis of a result of demodulation of the plurality of demodulation units.

(8)

The receiving device according to any one of (2) to (6), in which the video boundary information is information indicating a lead of a cycle of a group of pictures (GOP).

(9)

The receiving device according to any one of (1) to (8), in which a bit rate and robustness are different for each of the plurality of broadcast signals.

(10)

A data processing method of a receiving device, the method including:

a step of allowing the receiving device to receive a plurality of broadcast signals; and select a broadcast signal of a target from the plurality of broadcast signals, on the basis of a result of processing with respect to the broadcast signal.

(11)

A transmitting device, including:

a generating unit configured to generate video boundary information which is information indicating a boundary of a video of the same or corresponding contents; and a transmitting unit configured to transmit the video boundary information by including the video boundary information in each of a plurality of broadcast signals for transmitting the contents.

(12)

The transmitting device according to (11), in which the plurality of broadcast signals is transmitted in time division multiplexing (TDM), and the video boundary information is included in a header of a packet of a baseband before being modulated.

(13)

The transmitting device according to (11), in which the plurality of broadcast signals is transmitted in frequency division multiplexing (FDM), and the video boundary information is included in additional information of a segment unit.

(14)

The transmitting device according to (11), in which the video boundary information is included in a preamble of a physical frame.

(15)

The transmitting device according to any one of (11) to (14), in which the video boundary information includes information for specifying a stream including the boundary of the video.

(16)

The transmitting device according to any one of (11) to (15), in which the video boundary information is information indicating a lead of a cycle of a GOP.

(17)

The transmitting device according to any one of (11) to (16), in which a bit rate and robustness are different for each of the plurality of broadcast signals.

(18)

A data processing method of a transmitting device, the method including the steps of:

generating video boundary information which is information indicating a boundary of a video of the same or corresponding contents; and transmitting the video boundary information by including the video boundary information in each of a plurality of broadcast signals for transmitting the contents, the steps being performed by the transmitting device.

REFERENCE SIGNS LIST

1 Transmission system
10 Transmitting device
20 Receiving device
30 Transmission path
111 Component processing unit
112 Signaling processing unit
113 Processing unit
114 Modulation unit
210 Control unit
211 Tuner
212 Demodulation unit
213 Filter
214 Decoding unit 215 Output unit
1000 Computer
1001 CPU

The invention claimed is:

1. A receiving device, comprising:
receiving circuitry configured to receive a physical layer frame including a plurality of broadcast signals each including video boundary information which is information (i) indicating a boundary of a video of a same or corresponding contents and (ii) processed on a physical layer, the plurality of broadcast signals being transmitted in accordance with a time division multiplexing scheme, the video boundary information being included in a header of a baseband packet included in the physical layer after the baseband packet is demodulated; and
processing circuitry configured to (i) select a broadcast signal of a target from the plurality of broadcast signals on the basis of a result of processing with respect to the broadcast signal, and (ii) switch the broadcast signal of the target on the basis of the video boundary information processed on the physical layer.

2. The receiving device according to claim 1,
wherein the video boundary information includes information for specifying a stream including the boundary of the video.

3. The receiving device according to claim 1, further comprising:
demodulation circuitry configured to demodulate the plurality of broadcast signals,
wherein the processing circuitry is further configured to switch the broadcast signal of the target on the basis of a result of demodulation of the plurality of broadcast signals.

4. The receiving device according to claim 1,
wherein the video boundary information is information indicating a lead of a cycle of a group of pictures (GOP).

5. The receiving device according to claim 4,
wherein a bit rate and robustness are different for each of the plurality of broadcast signals.

6. A data processing method of a receiving device, the method comprising:
receiving, by receiving circuitry of the receiving device, a physical layer frame including a plurality of broadcast signals each including video boundary information which is information (i) indicating a boundary of a video of a same or corresponding contents and (ii) processed on a physical layer, the plurality of broadcast signals being transmitted in accordance with a time division multiplexing scheme, the video boundary information being included in a header of a baseband packet included in the physical layer after the baseband packet is demodulated;
selecting, by processing circuitry of the receiving device, a broadcast signal of a target from the plurality of broadcast signals, on the basis of a result of processing with respect to the broadcast signal; and
switching, by the processing circuitry of the receiving device, the broadcast signal of the target on the basis of the video boundary information processed on the physical layer.

7. A transmitting device, comprising:
processing circuitry configured to generate video boundary information which is information (i) indicating a boundary of a video of a same or corresponding contents and (ii) processed on a physical layer; and
transmission circuitry configured to, for transmitting the contents, transmit a physical layer frame including a plurality of broadcast signals each including the video boundary information, the plurality of broadcast signals being transmitted in accordance with a time division multiplexing scheme, the video boundary information being included in a header of a baseband packet included in the physical layer after the baseband packet is demodulated.

8. The transmitting device according to claim 7,
wherein the video boundary information includes information for specifying a stream including the boundary of the video.

9. The transmitting device according to claim 7,
wherein the video boundary information is information indicating a lead of a cycle of a GOP.

10. The transmitting device according to claim 7,
wherein a bit rate and robustness are different for each of the plurality of broadcast signals.

11. A data processing method of a transmitting device, the method comprising the steps of:
generating, by processing circuitry of the transmitting device, video boundary information which is information (i) indicating a boundary of a video of a same or corresponding contents and (ii) processed on a physical layer; and
transmitting the contents in a physical layer frame including a plurality of broadcast signals each including the video boundary information, the plurality of broadcast signals being transmitted in accordance with a time division multiplexing scheme, the video boundary information being included in a header of a baseband packet included in the physical layer after the baseband packet is demodulated.

* * * * *